(12) United States Patent
Nomura et al.

(10) Patent No.: US 6,788,475 B2
(45) Date of Patent: Sep. 7, 2004

(54) LENS BARREL HAVING A LENS BARRIER MECHANISM

(75) Inventors: Hiroshi Nomura, Saitama (JP); Yoshihiro Yamazaki, Saitama (JP); Isao Okuda, Saitama (JP); Satoru Nakamura, Tokyo (JP)

(73) Assignee: PENTAX Corporation, Tokyo (JP)

( * ) Notice: Subject to any disclaimer, the term of this patent is extended or adjusted under 35 U.S.C. 154(b) by 61 days.

(21) Appl. No.: 10/101,727

(22) Filed: Mar. 21, 2002

(65) Prior Publication Data

US 2002/0135888 A1 Sep. 26, 2002

(30) Foreign Application Priority Data

Mar. 22, 2001 (JP) ........................................ 2001-083265
Mar. 22, 2001 (JP) ........................................ 2001-083690

(51) Int. Cl.[7] .............................. G02B 15/14; G02B 7/02
(52) U.S. Cl. ........................ 359/700; 359/701; 359/704; 359/819
(58) Field of Search ................................ 359/699, 700, 359/701, 704, 819, 823, 695

(56) References Cited

U.S. PATENT DOCUMENTS

| | | | |
|---|---|---|---|
| 5,130,730 A | 7/1992 | Ishii et al. | 396/448 |
| 5,159,372 A | 10/1992 | Nomura et al. | 396/448 |
| 5,313,329 A | 5/1994 | Ueda | 359/676 |
| 5,589,987 A | 12/1996 | Tanaka | 359/701 |
| 5,602,607 A * | 2/1997 | Kato et al. | 396/349 |
| 5,614,973 A | 3/1997 | Azegami | 396/448 |
| 5,812,889 A | 9/1998 | Nomura et al. | 396/87 |
| 6,014,269 A | 1/2000 | Nomura et al. | 359/701 |
| 6,657,794 B2 * | 12/2003 | Nomura et al. | 359/699 |
| 6,665,129 B2 * | 12/2003 | Nomura et al. | 359/700 |

* cited by examiner

*Primary Examiner*—Georgia Epps
*Assistant Examiner*—Tim Thompson
(74) *Attorney, Agent, or Firm*—Greenblum & Bernstein, P.L.C.

(57) ABSTRACT

A lens barrel includes a stationary barrel, an outer ring, an inner ring, a cam ring and a movable lens frame, arranged in that order from outermost side, wherein the axes thereof coincide with a common optical axis, the outer ring being guided linearly in the optical axis direction by the stationary barrel, the inner ring being linearly guided in the optical axis direction by the outer ring, and the cam ring being rotatable to move the movable lens frame in the optical axis direction; and a lens barrier mechanism having an aperture positioned in front of the movable lens frame, the lens barrier mechanism being provided on a front opening of the inner ring, for opening and closing the aperture.

20 Claims, 17 Drawing Sheets

LENS BARREL HAVING A LENS BARRIER MECHANISM

BACKGROUND OF THE INVENTION

1. Field of the Invention

The present invention relates to a lens barrel provided at the front end thereof with a lens barrier mechanism which is driven to open and close its barrier blades for protecting the frontmost lens surface from being stained or damaged.

2. Description of the Related Art

As an example of a conventional lens barrel having a lens barrier mechanism, a lens barrel which is provided therein with a stationary ring, a rotating cam ring positioned inside the stationary ring, and an exterior ring member positioned between the stationary ring and the cam ring, is known in the art. The cam ring is provided with a set of follower pins, and the exterior ring member is provided with a corresponding set of cam grooves in which the set of follower pins of the cam ring are respectively engaged. The lens barrier mechanism having barrier blades driven to open and close a photographing aperture of the lens barrel is fixed to the front end opening of the exterior ring member. Driving the cam ring to rotate in forward and reverse directions causes the exterior ring member to advance and retreat in an optical axis direction while opening and closing the barrier blades of the lens barrier mechanism, respectively.

In such a conventional lens barrel, the diameter of the exterior ring member is preferably as small as possible from a design point of view. On the other hand, in order for the barrier blades to be widely opened to open the photographing aperture widely, the diameter of the lens barrier mechanism needs to be large. However, the inner diameter of the exterior ring member has to be large if the diameter of the lens barrier mechanism is large.

In the case where one or more cam grooves are formed on an inner peripheral surface of the exterior ring member, the wall of the exterior ring member has to be thick because the cam groove generally has a deep radial depth. Accordingly, the inner diameter of the exterior ring member decreases and increases if the outer diameter of the exterior ring member is decreased and increased, respectively.

Although the diameter of the lens barrel is desirably small from a design point of view, with regard to the outward appearance thereof, each barrier blade of the lens barrier mechanism needs to have a long length if it is desired to provide a large photographing aperture which is opened and closed by the lens barrier mechanism. However, the diameter of the lens barrel increases if the length of the barrier blade is increased.

SUMMARY OF THE INVENTION

The present invention provides a lens barrel having a lens barrier mechanism fixed to a ring member, wherein the ring member is successfully formed to have a large inner diameter with a minimum increase of the outer diameter of the ring member so that the lens barrier mechanism having a large diameter can be fixed to the ring member. The present invention further provides a lens barrel having a lens barrier mechanism, wherein the lens barrier mechanism fixed to a ring member is successfully provided with a set of long barrier blades without an increase of the diameter of the ring member and without complicating the structure of the lens barrier mechanism.

For example, in an embodiment, a lens barrel is provided, including a stationary barrel, an outer ring, an inner ring, a cam ring and a movable lens frame, arranged in that order from outermost side, wherein the axes thereof coincide with a common optical axis, the outer ring being guided linearly in the optical axis direction by the stationary barrel, the inner ring being linearly guided in the optical axis direction by the outer ring via a linear guide key and a linear guide groove provided on one and the other of said inner ring and said outer ring, respectively, the cam ring being rotatable to move the movable lens frame in the optical axis direction; and a lens barrier mechanism having an aperture positioned in front of the movable lens frame, the lens barrier mechanism being provided on a front opening of the inner ring, for opening and closing the aperture.

The outer ring can be linearly guided in the optical axis direction relative to the stationary barrel via a linear guide key and a linear guide groove provided on one and other of the outer ring and the stationary barrel, respectively.

The cam ring can include a thick-wall cylinder portion and a circumferential groove provided in front of the thick-wall cylinder portion. The outer ring can include projections formed at a rear end portion of the outer ring to be engaged in the circumferential groove to be rotatable about the optical axis along the circumferential groove, whereby the cam ring is movable in the optical axis direction together with the outer ring.

The cam ring can include at least one first cam groove and at least one second cam groove formed on inner and outer surfaces of the cam ring, respectively, the lens barrel further including a first cam mechanism for moving the movable lens frame forward from the cam ring in the optical axis direction by the rotation of the cam ring in accordance with a profile of the first cam groove; and a second cam mechanism for moving the inner ring in the optical axis direction by rotation of the cam ring in accordance with a profile of the second cam groove.

The profile of the first cam groove and the profile of the second cam groove can be formed so as to move the movable lens frame and the inner ring while maintaining a substantially constant distance therebetween in the optical axis direction.

The lens barrier mechanism can include a pair of barrier blades driven to open and close the aperture; and a drive ring driven to rotate about the optical axis to drive the pair of barrier blades to open and close the aperture, the drive ring having at least one engaging surface. The cam ring can include at least one rotation transfer face formed at a front end of the cam ring to extend parallel to the optical axis, the rotation transfer face coming into contact with corresponding the engaging surface of the drive ring to rotate the drive ring. A portion of at least one of the first cam groove and the second cam groove extends in front of a rearward edge of the rotation transfer face in the optical axis direction.

The drive ring can include at least one recess, the engaging surface of the drive ring being formed as one surface of the recess.

The cam ring can include at least one recess formed at the front end of the cam ring at portions other than portions of the cam ring on which the first cam groove and the at least second cam groove are formed, the rotation transfer face of the cam ring constituting one surface of the recess.

It is desirable for the inner ring and the outer ring to be movable between respective accommodation positions and respective advanced positions in front of the respective accommodation positions. The inner ring can include an opening which corresponds with the rotation transfer face of the cam ring. The rotation transfer face of the cam ring extends through the inner ring via the opening of the inner ring to come in contact with corresponding the engaging surface of the drive ring when the inner ring and the outer ring are positioned in the respective accommodation positions.

The lens barrel can be a zoom lens barrel.

The thick-wall cylinder portion can be formed at a rear end of the cam ring, the circumferential groove being formed on an outer peripheral surface of the cam ring immediately in front of the thick-wall cylinder portion, and the projections extending radially inwards to be engaged in the circumferential groove.

The second cam mechanism can move the inner ring forward in the optical axis direction relative to the cam ring via the rotation of the cam ring in accordance with the profile of the second cam groove.

It is desirable for the recess to be formed on an outer peripheral surface of the drive ring.

In another embodiment, a lens barrel is provided, having a lens barrier mechanism for opening and closing an aperture in front of a lens group, the lens barrier mechanism being fixed to a front end of a ring member provided around the lens group, the lens barrier mechanism including a pair of barrier blades each of which is rotatable about a pivot in order to open and close the aperture; and a pair of recesses formed on an inner periphery of the ring member so as to allow the pair of barrier blades to partly enter the pair of recesses, respectively, when the pair of barriers fully open said aperture.

It is desirable for at least part of the ring member to be formed as synthetic resin.

The ring member can include a main ring body made of synthetic resin; and a metal reinforcing ring fitted on the main ring body to be fixed thereto; wherein the pair of recesses are formed on the main ring body. A radially outermost position at a free end of each the pair of barrier blades is defined by an inner peripheral surface of the reinforcing ring.

The lens barrier mechanism can further include a front end exterior plate on which the aperture is formed, each the pivot projecting rearward from a rear surface of the front exterior plate.

The lens barrel can be an extendable lens barrel.

In another embodiment, a photographing lens barrel is provided, including a pivoted barrier blade driven to open and close a photographing aperture in front of a front lens group; a ring member provided around the lens group, the pivoted barrier blade being supported by a front portion of the ring member; and a recess formed on the ring member so as to allow the barrier blade to partly enter the recess.

The present disclosure relates to subject matter contained in Japanese Patent Applications Nos. 2001-83265 and 2001-83690 (both filed on Mar. 22, 2001) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
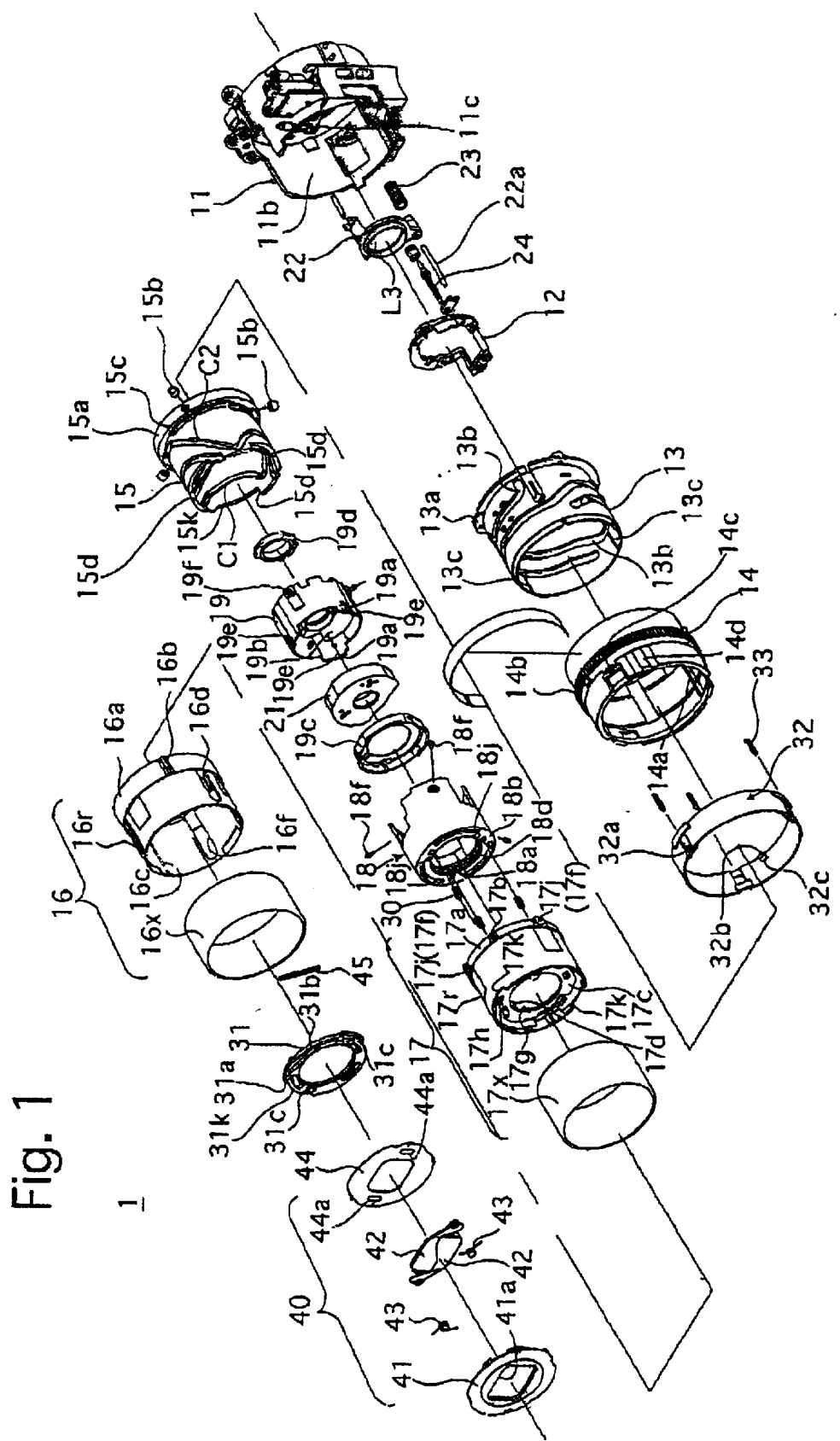
FIG. 1 is an exploded perspective view of an embodiment of a zoom lens barrel according to the present invention.

FIG. 1 is an exploded perspective view of an embodiment of an extendable zoom lens barrel for a digital camera.

Figure 3:
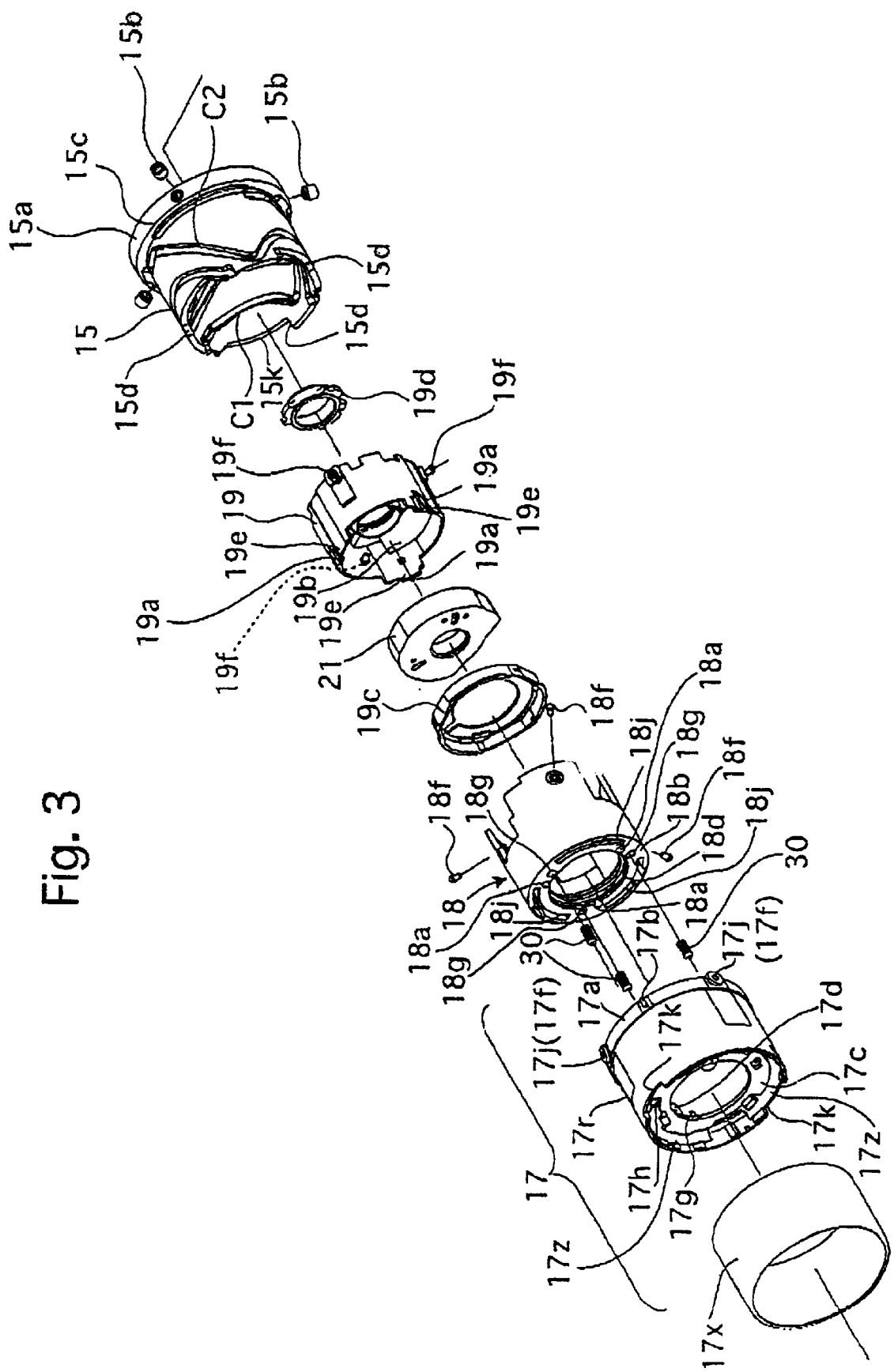
FIG. 3 is an exploded perspective view of a middle portion of the zoom lens barrel shown in FIG. 1.

The zoom lens barrel 1 is provided with a lens-drive cam mechanism which includes a set of three lens-drive cam grooves C1 formed on a cam ring 15, a set of three follower pins 18*f* fixed to a first lens group moving frame (movable lens frame) 18, a set of three follower pins 19*f* fixed to a second lens group moving frame 19, a set of three linear guide bosses 17*d* (only one of them appears in FIGS. 1 and 3) of an inner ring 17, a set of three linear guide holes 18*a* of the first lens group moving frame 18, and a set of three linear guide grooves 18*c* of the first lens group moving frame 18 and a set of three linear guide keys 19*a* of the second lens group moving frame 19. The zoom lens barrel 1 is further provided with a ring-drive cam mechanism which includes a set of three cam grooves C2 formed on the cam ring 15, a set of three follower pins 17f (only one of them appears in FIG. 5) fixed to the inner ring 17, a set of three linear guide keys 17b formed on the inner ring 17, and a set of three linear guide grooves 16c formed on an outer ring 16.

Figure 5:
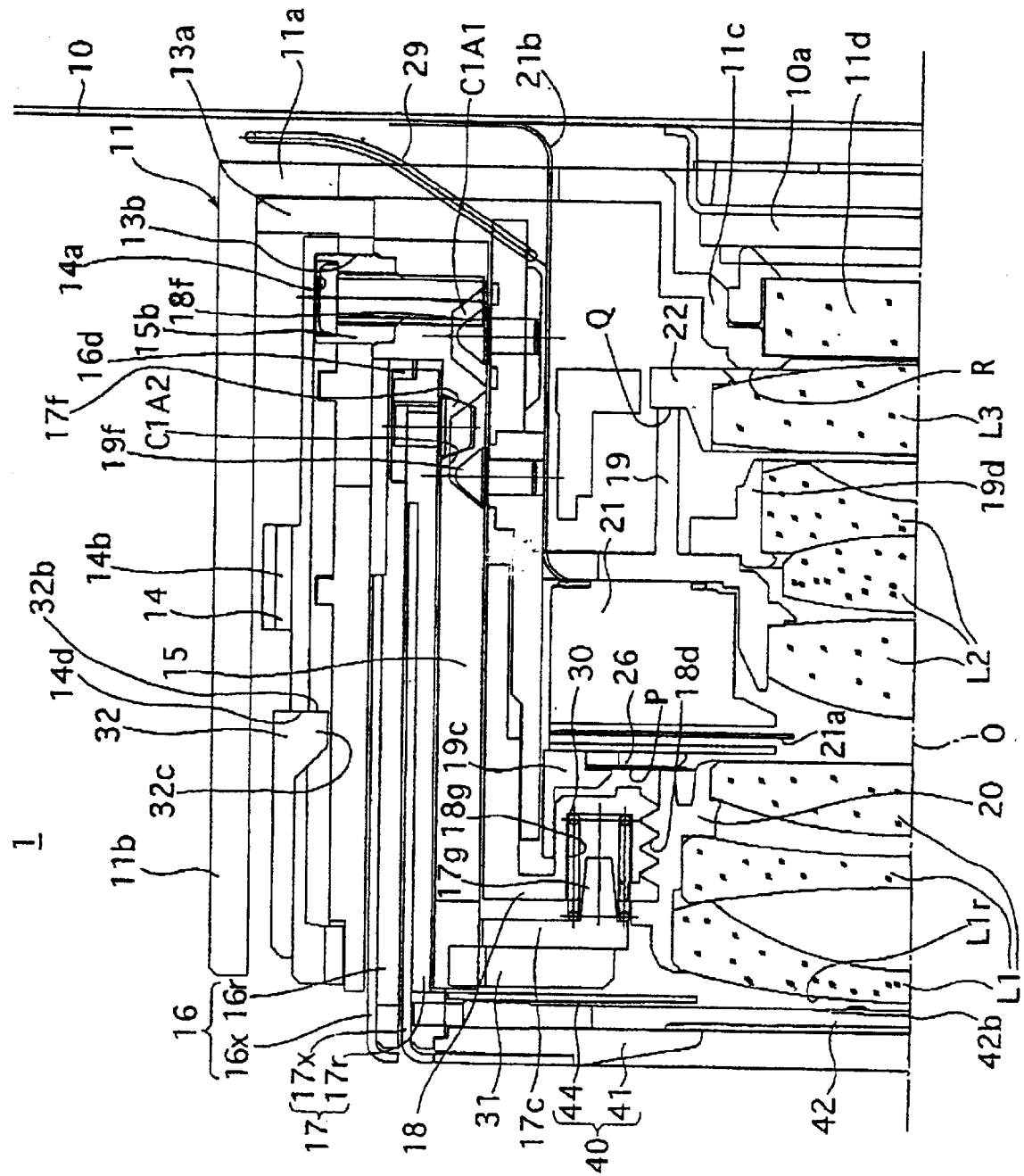
FIG. 5 is an axial cross sectional view of the zoom lens barrel shown in FIG. 1, above the optical axis, showing the zoom lens barrel in an accommodation state.
Figure 6:
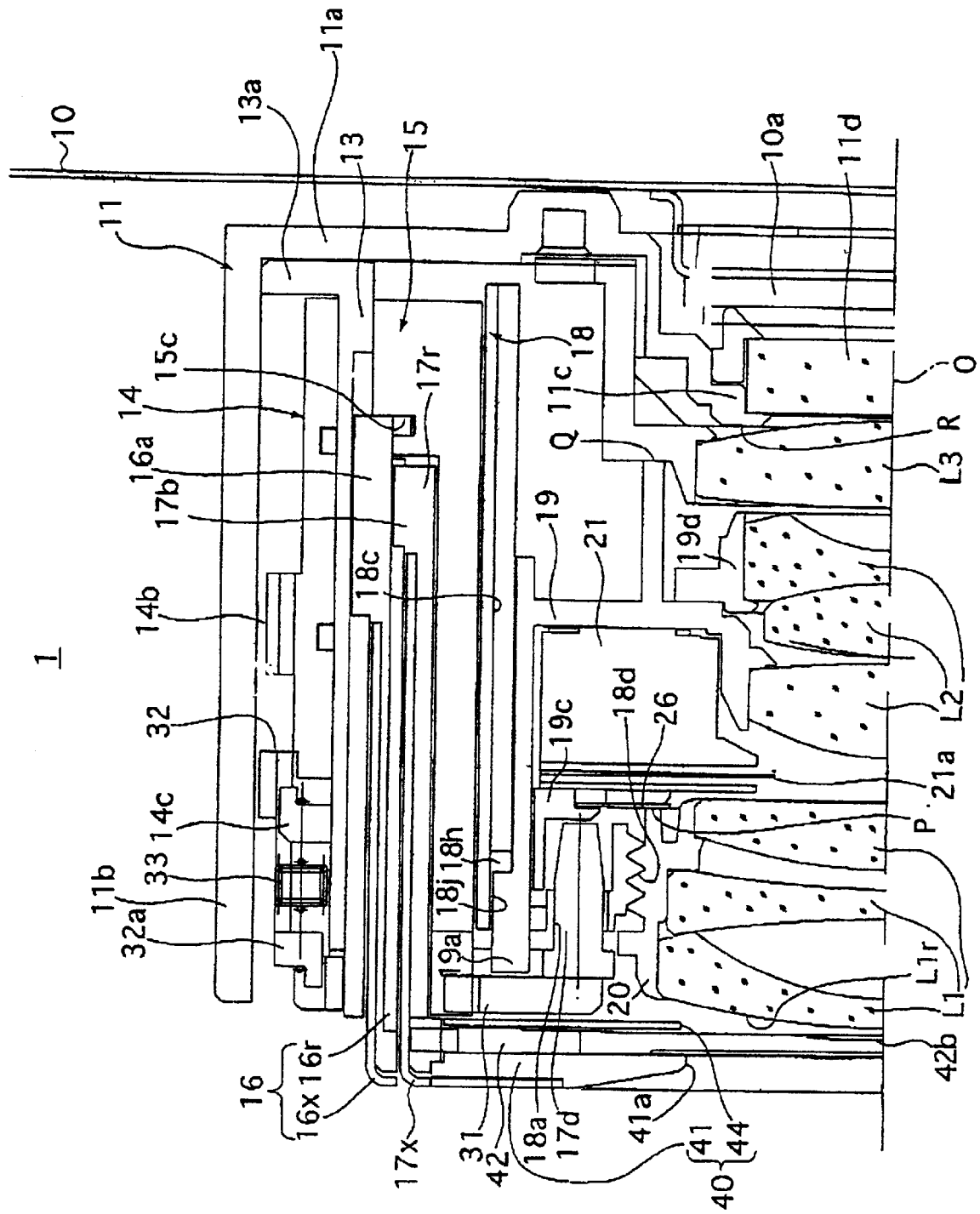
FIG. 6 is an axial cross sectional view of the zoom lens barrel shown in FIG. 1, above the optical axis, taken along a plane different from that of FIG. 5, showing the zoom lens barrel in an accommodation state.
Figure 7:
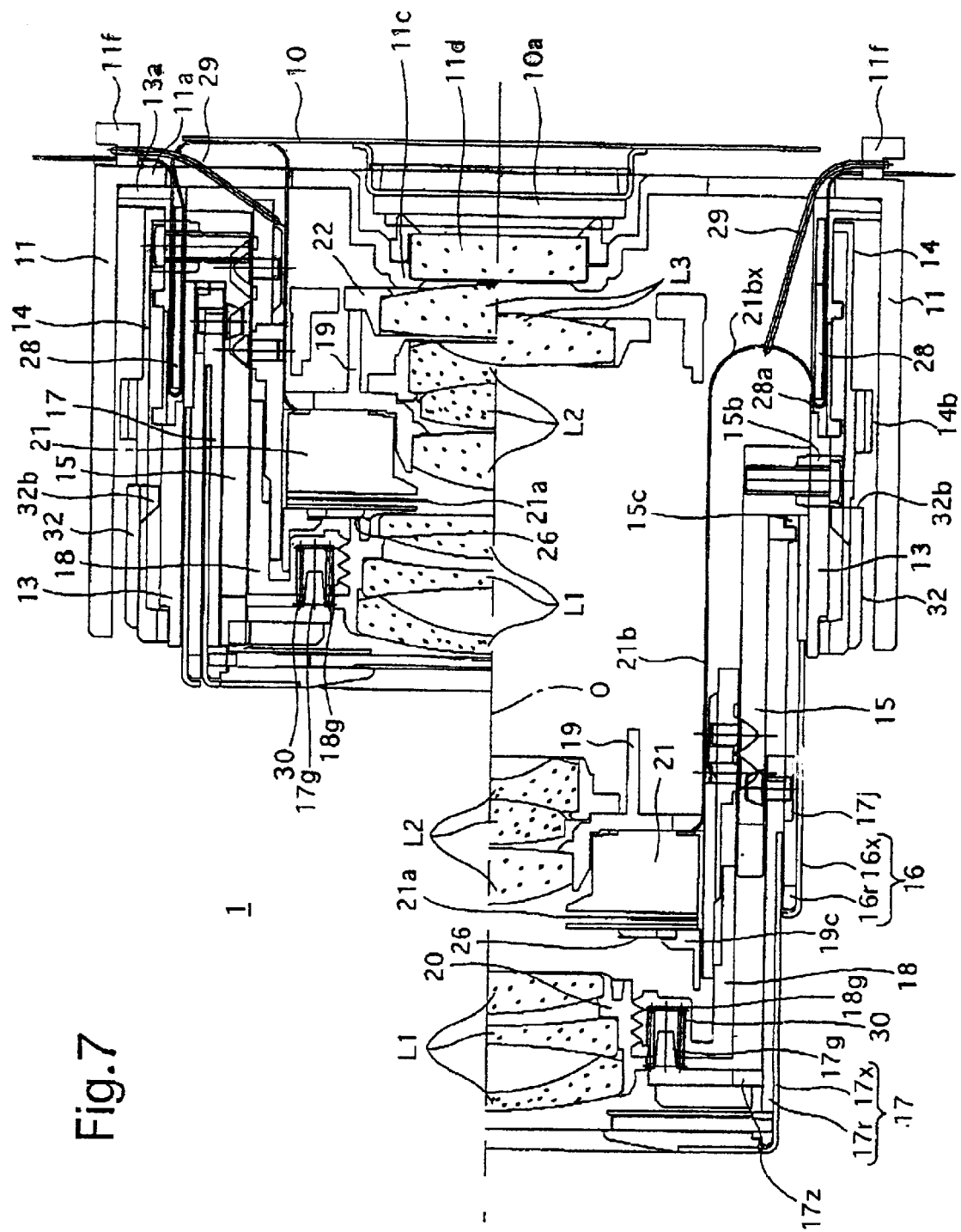
FIG. 7 is an axial cross sectional view of the zoom lens barrel shown in FIG. 1, showing the zoom lens barrel in an accommodation state above the optical axis, and further showing the zoom lens barrel in a ready-to-photograph state below the optical axis.

As can be clearly seen in FIGS. 5 through 7, the zoom lens: barrel 1 is provided with a photographing optical system including three lens groups: a first lens group L1, a second lens group L2 and a third lens group L3, in that order from the object side (the left side as viewed in each of FIGS. 5 through 7). The first and second lens groups L1 and L2 are driven to move along an optical axis O relative to the third lens group L3 while varying the distance therebetween to perform zooming operation. The third lens group L3 serves as a focusing lens group, and is driven to move along the optical axis O to perform focusing operation.

The zoom lens barrel 1 is provided with a housing 11, a shaft holding member 12 and a stationary ring 13, which are all stationary members fixed to a camera body (not shown). Accordingly, the housing 11, the shaft holding member 12 and the stationary ring 13 do not move in the direction of the optical axis O (i.e., in the optical axis direction) or rotates about the optical axis O. The housing 11 is provided at a rear end thereof with a flange 11a (see FIG. 4), while the stationary ring 13 is provided at a rear end thereof with a flange 13a which is fixed to the flange 11a of the housing 11. The housing 11 is provided with an outer cylindrical portion 11b and a filter holding portion 11c to which a low-pass filter 11d is fixed. As shown in FIGS. 5 through 7, the low-pass filter 11d is positioned in front of a CCD (solid-state image pick-up device) 10a fixed to a stationary base 10 positioned in the camera body.

The stationary ring 13 is positioned inside the outer cylindrical portion 11b of the housing 11. The zoom lens barrel 1 is provided, on the stationary ring 13 between the stationary ring 13 and the outer cylindrical portion 11b, with a rotatable ring 14. The stationary ring 13 is positioned inside the rotatable ring 14 which supports the cam ring 15 therein. The stationary ring 13 is provided with a set of three cam slots (cam-ring-control cam slots) 13b formed on the stationary ring 13 as through-slots at equi-angular intervals in a circumferential direction thereof. The cam ring 15 is provided at the rear end thereof with a thick-wall cylinder portion 15a. A set of three follower pins 15b fixed to the thick-wall cylinder portion 15a at equi-angular intervals in a circumferential direction of the cam ring 15 pass through the set of three cam slots 13b of the stationary ring 13 to be engaged in a set of three rotation transfer grooves 14a (only of which appears in FIGS. 1 and 4) which are formed on an inner peripheral surface of the rotatable ring 14.

Figure 11:
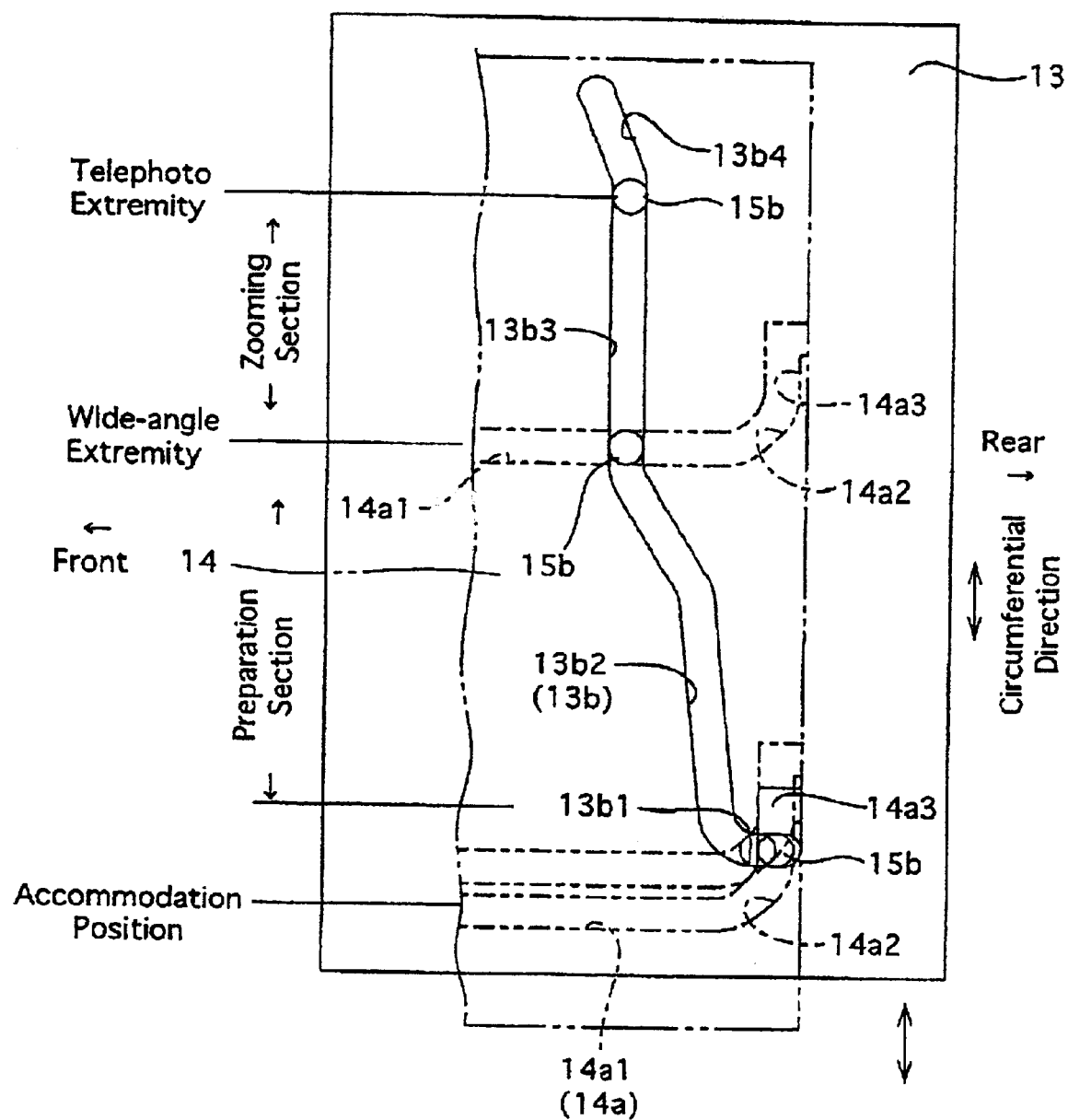
FIG. 11 is a schematic developed view of a cam-ring-control cam slot formed on a stationary ring and an associated rotation transfer groove formed on a rotatable ring.

FIG. 11 shows a developed view of one of the three cam slots 13b and the associated one of the three rotation transfer grooves 14a. Each rotation transfer groove 14a includes a linear groove portion 14a1, an inclined groove portion 14a2, and a circumferential groove portion 14a3 in that order from the front end to the rear end of the linear groove portion 14a1 (from left to right as viewed in FIG. 11). The linear groove portion 14a1, which occupies a major portion of the rotation transfer groove 14a, extends parallel to the optical axis O. The circumferential groove portion 14a3 of each rotation transfer groove 14a is used only when the zoom lens barrel 1 is assembled/disassembled. Each cam slot 13b includes a linear slot portion 13b1, a state-changing slot portion 13b2, a zooming slot portion 13b3, and a terminal slot portion 13b4, in that order from the end (the lower end as viewed in FIG. 11) of the cam slot 13b which closest to the rear end of the stationary ring 13. The linear slot portion 13b1 extends parallel to the optical axis O. The state-changing slot portion 13b2 extends in a direction inclined with respect to both the optical axis O and a circumferential direction of the stationary ring 13. The zooming slot portion 13b3 extends in a circumferential direction of the stationary ring 13. The terminal slot portion 13b4 is used only when the zoom lens barrel 1 is assembled/disassembled.

The rotating barrel 14 rotates about the optical axis O in a rotational range between an accommodation position (accommodation position) and a telephoto extremity via a wide-angle extremity. This rotational range includes a preparation section (preparation stage) which extends between the accommodation position and the wide-angle extremity, and a zooming section which extends between the wide-angle extremity to the telephoto extremity (see FIG. 11). If the rotatable ring 14 rotates relative to the stationary ring 13 in a state where each follower pin 15b is engaged in the inclined groove portion 14a2 of the associated rotation transfer groove 14a and the linear slot portion 13b1 of the associated cam slot 13b (i.e., in a state where the rotatable ring 14 is in the accommodation position and where the cam ring 15 is fully retracted), each follower pin 15b of the cam ring 15 is pressed by a side edge of the linear slot portion 13b1 of the associated cam slot 13b, which causes the cam ring 15 to move in the optical axis direction along the linear slot portion 13b1 without rotating about the optical axis O. If the rotatable ring 14 rotates relative to the stationary ring 13 in a state where each follower pin 15b is engaged in the linear groove portion 14a1 of the associated rotation transfer groove 14a and the state-changing slot portion 13b2 of the associated cam slot 13b (i.e., in a state where the rotatable ring 14 is in the preparation section), each follower pin 15b of the cam ring 15 moves along the state-changing slot portion 13b2 of the associated cam slot 13b, which causes the cam ring 15 to rotate about the optical axis O while moving in the optical axis direction due to the engagement of the follower pin 15b with the state-changing slot portion 13b2. If the rotatable ring 14 rotates relative to the stationary ring 13 in a state where each follower pin 15b is engaged in the linear groove portion 14a1 of the associated rotation transfer groove 14a and the zooming slot portion 13b3 of the associated cam slot 13b (i.e., in a state where the rotatable ring 14 is in the zooming section), each follower pin 15b of the cam ring 15 moves along the zooming slot portion 13b3 of the associated cam slot 13b, which causes the cam ring 15 to rotate about the optical axis O without moving in the optical axis direction.

The rotatable ring 14 is provided on an outer peripheral surface thereof with a circumferential gear 14b which is in mesh with a drive pinion (not shown). The drive pinion is driven by a reversible motor (not shown) to rotate forwardly and reversely. Rotation of the drive pinion causes the rotatable ring 14 to rotate to thereby move the cam ring 15 in the optical axis direction while rotating about the optical axis O. Accordingly, if the accommodation position of the cam ring 15 is regarded as a starting position (reference position) of movement of the cam ring 15, firstly the cam ring 15 moves linearly in the optical axis direction without rotating about the optical axis O (due to the linear slot portions 13b1), subsequently the cam ring 15 moves in the optical axis direction while rotating about the optical axis O (due to the state-changing slot portions 13b2 in the preparation section), and finally the cam ring 15 rotates about the optical axis O without moving in the optical axis direction (due to the zooming slot portion 13b3 in the zooming section).

In the present embodiment of the zoom lens barrel 1, the rotatable ring 14, the cam ring 15 and a barrier drive ring 31 are rotatable elements. The remaining movable elements, except for the second lens group moving frame 19, linearly move in the optical axis direction without rotating about the optical axis O. The second lens group moving frame 19 can rotate about the optical axis O slightly. Such linearly moving elements and guiding mechanisms thereof will be hereinafter discussed. The zoom lens barrel 1 is provided between the stationary ring 13 and the cam ring 15 with an outer ring 16 and the inner ring 17 which is provided inside the outer ring 16. The outer ring 16 and the inner ring 17 are positioned in an annular space between the cam ring 15 and the stationary ring 13, while the thick-wall cylinder portion 15a of the cam ring 15 is engaged with an inner peripheral surface of the stationary ring 13 so that the cam ring 15 can rotate about the optical axis O relative to the stationary ring 13 without tilting relative to the optical axis O.

Figure 2:
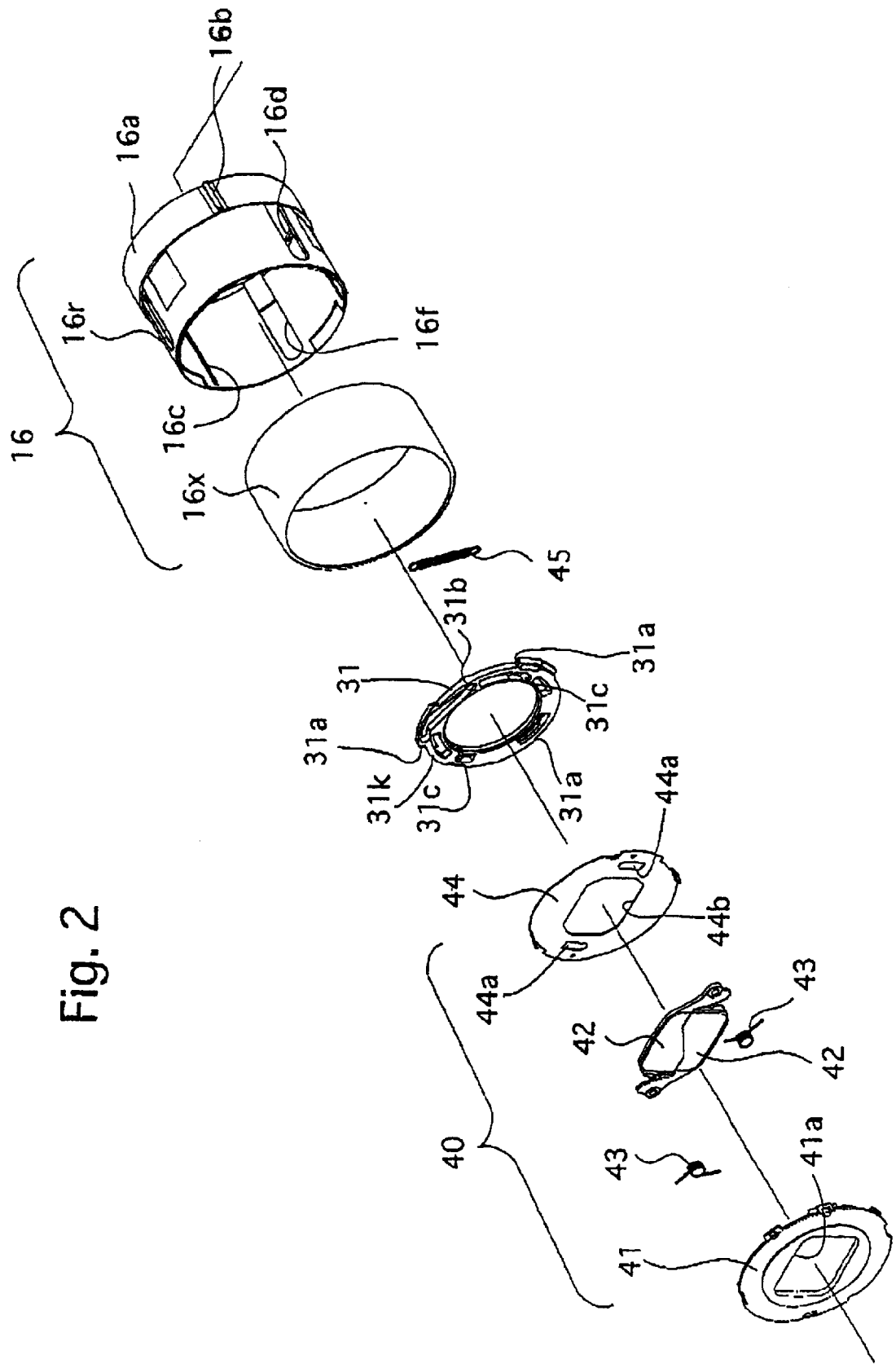
FIG. 2 is an exploded perspective view of an upper left portion of the zoom lens barrel shown in FIG. 1.

As shown in FIG. 2, the outer ring 16, which is positioned immediately inside of the stationary ring 13, includes a main ring body 16r and a reinforcing ring 16x which are made of synthetic resin and metal, respectively. The main ring body 16r is provided at a rear end thereof with a thick-wall cylinder portion 16a, and is further provided, on the thick-wall cylinder portion 16a at equi-angular intervals in a circumferential direction of the main ring body 16r, with a set of three linear guide keys 16b (only one of which appears in FIGS. 1 and 2) which extend radially outwards. The stationary ring 13 is provided on an inner peripheral surface thereof with a set of three linear guide grooves 13c which extend parallel to the optical axis O, and in which the set of three linear guide keys 16b of the main ring body 16r are slidably engaged in the set of three linear guide grooves 13c, respectively. The metal reinforcing ring 16x is fitted on, and adhered to, an outer peripheral surface of the main ring body 16r in front of the thick-wall cylinder portion 16a by an adhesive to reinforce the main ring body 16r with a minimum increase in wall thickness of the outer ring 16, which contributes to a reduction in wall thickness of the zoom lens barrel 1, i.e., contributes to further miniaturization of the zoom lens barrel 1.

Similar to the outer ring 16, the inner ring 17 includes a main ring body 17r and a reinforcing ring 17x which are made of synthetic resin and metal, respectively. The main ring body 17r is provided at a rear end thereof with a thick-wall cylinder portion 17a. The metal reinforcing ring 17x is fitted on and adhered to an outer peripheral surface of the main ring body 17r in front of the thick-wall cylinder portion 17a by an adhesive to reinforce the main ring body 17r with a minimum increase in wall thickness of the inner ring 17, which contributes to a reduction in wall thickness of the zoom lens barrel 1, i.e., contributes to further miniaturization of the zoom lens barrel 1.

The outer ring 16 is provided, on an inner peripheral surface of the main ring body 16r at equi-angular intervals in a circumferential direction of the outer ring 16, with the aforementioned set of three linear guide grooves 16c which extend parallel to the optical axis O. The inner ring 17 is provided on the thick-wall cylinder portion 17a with the aforementioned set of three linear guide keys 17b which extend radially outwards to be slidably engaged in the set of three linear guide grooves 16c of the main ring body 16r, respectively. The outer ring 16 is provided at the rear end thereof with a set of three bayonet prongs (projections) 16d (only one of which appears in FIG. 5) which extend radially inwards. The cam ring 15 is provided, in the vicinity of the rear end thereof immediately in front of the thick-wall cylinder portion 15a, with a circumferential groove 15c in which the set of three bayonet prongs 16d are engaged to be movable in the circumferential groove 15c within a predetermined angle of rotation. When the cam ring 15 is positioned within an operating angle relative to the outer ring 16, the cam ring 15 and the outer ring 16 are movable together in the optical axis direction without disengaging from each other, and at the same time, the cam ring 15 is rotatable about the optical axis O relative to the outer ring 16 due to the engagement of the set of three bayonet prongs 16d with the circumferential groove 15c.

The main ring body 17r of the inner ring 17 is provided in the vicinity of the front end thereof with an inner flange 17c which extends radially inwards and to which a barrier unit 40 and the barrier drive ring 31 are fixed. The main ring body 17r of the inner ring 17 is provided, on an rear face of the inner flange 17c at equi-angular intervals in a circumferential direction of the inner ring 17, with the set of three linear guide bosses 17d (only one of which appears in FIGS. 1 and 3). The zoom lens barrel 1 is provided with the first lens group moving frame 18 which is provided in the inner ring 17. The first lens group moving frame 18 is provided at the front end thereof with an inner flange 18b which extends radially inwards to form a circular aperture having the center thereof about the optical axis O. A female thread portion 18d is formed on an inner peripheral face of the inner flange 18b. The first lens group moving frame 18 is provided on the inner flange 18b with the set of three linear guide holes 18a in which the set of three linear guide bosses 17d of the inner ring 17 are slidably engaged, respectively. Each linear guide hole 18a is formed having an oval cross section which is elongated in a radial direction of the first lens group moving frame 18. Even if each linear guide boss 17d is fitted in the associated linear guide hole 18a with a substantial clearance therebetween, the inner ring 17 is guided in the optical axis direction relative to the first lens group moving frame 18 with a sufficient degree of precision since the first lens group moving frame 18 is slidably fitted into the cam ring 15. The first lens group moving frame 18 is provided, on an inner peripheral surface thereof at equi-angular intervals in a circumferential direction thereof, with the set of three linear guide grooves 18c which extend parallel to the optical axis O.

The second lens group moving frame 19 is fitted in the first lens group moving frame 18. The second lens group moving frame 19 is provided, on an outer peripheral surface thereof at the front end of the outer peripheral surface, with the set of three linear guide keys 19a which are slidably engaged into the set of three linear guide grooves 18c of the first lens group moving frame 18, respectively.

As shown in FIGS. 5, 6 and 7, the second lens group L2 includes three lens elements: front, middle and rear lens elements. The front lens element is fixed to the second lens group moving frame 19 to be directly supported thereby. The rear lens element is supported by a support ring 19d which is fixed to the second lens group moving frame 19 from rear thereof, so that the rear lens element is supported by the second lens group moving frame 19 via the support ring 19d. The middle lens element is fixed to the rear lens element so that a rear surface of the middle lens element is cemented to a front surface of the rear lens element. Accordingly, the middle lens element of the second lens group L2 is supported by the second lens group moving frame 19 via the rear lens element of the second lens group L2 and the support ring 19d.

As can be understood from the above description, according to the above described guiding mechanisms of the zoom lens barrel 1, the outer ring 16 is guided linearly in the optical axis direction without rotating about the optical axis O via the stationary ring 13, the inner ring 17 is guided linearly in the optical axis direction without rotating about the optical axis O via the outer ring 16, the first lens group moving frame 18 is guided linearly in the optical axis direction without rotating about the optical axis O via the inner ring 17, and the second lens group moving frame 19 is guided linearly in the optical axis direction without rotating about the optical axis O via the first lens group moving frame 18, in that order from the outside to the inside of the zoom lens barrel 1. Furthermore, the linear guiding mechanism provided between the inner ring 17 and the first lens group moving frame 18 includes the set of three linear guide bosses 17d, which extend in a direction parallel to the optical axis, and the set of three linear guide holes 18a, and is positioned in the vicinity of the front end of the inner ring 17 and the first lens group moving frame 18. Due to this structure, no other linear guiding elements have to be provided on either the inside or the outside of the cam ring 15. This contributes to a reduction of the annular space between the inner ring 17 and the first lens group moving frame 18 to thereby minimize the diameter of the zoom lens barrel 1.

As shown in FIGS. 5 through 7, the zoom lens barrel 1 is provided with a first lens frame (lens supporting frame) 20 to which the first lens group L1 is fixed. The first lens frame 20 is fixed to the first lens group moving frame 18, so that the first lens frame 20 and the first lens group moving frame 18 constitute a front lens support member. Accordingly, the first lens group L1 is supported by the first lens group moving frame 18 via the first lens frame 20. More specifically, the first lens frame 20 is provided on an outer peripheral surface thereof with a male thread portion which is in mesh with the female thread portion 18d of the inner flange 18b. The first lens frame 20 is cemented to the first lens group moving frame 18 by an adhesive after the thread engagement position of the male thread portion of the first lens frame 20 with respect to the female thread portion 18d of the inner flange 18b has been adjusted during assembly. The zoom lens barrel 1 is provided in an annular recess 19b of the second lens group moving frame 19 with a shutter unit 21 which is fixed to the second lens group moving frame 19 by set screws (not shown). A light shield ring 19c is fitted in the second lens group moving frame 19 from front thereof to be fixed thereto to hold the shutter unit 21 between the light shield ring 19c and the second lens group moving frame 19. The shutter unit 21 is provided with shutter blades 21a. The shutter unit 21 drives the shutter blades 21a to open and close in accordance with information on an object brightness. The zoom lens barrel 1 is provided therein with a flexible printed wiring board (flexible PWB) 21b one end (front end) of which is fixed to the shutter unit 21 (see FIG. 7). A drive signal is given to the shutter unit 21 via the flexible PWB 21b. As shown in FIG. 7, the flexible PWB 21b extends rearward from the shutter unit 21, and subsequently bends radially outwards to extend forward. Subsequently, the flexible PWB 21b penetrates the stationary ring 13 via a through-slot 28a (see FIGS. 4 and 7) formed thereon, and bends radially outwards to extend rearward along a guiding portion 28 of the stationary ring 13 which extends parallel to the optical axis O. A portion of the flexible PWB 21b which extends along the outer surface of the guiding portion 28 is cemented thereto. Subsequently, the flexible PWB 21b extends rearward to be positioned outside the housing 11. As shown in FIG. 7, a bending portion 21bx of the flexible PWB 21b in the vicinity of the through-slot 28a passes through a rubber band 29 which is hooked over a hook 11f formed at the rear end of the housing 11. In a state where the zoom lens barrel 1 is fully extended as shown below the optical axis O in FIG. 7, the front end of the stretched rubber band 29 is positioned behind the position of the through-slot 28a in the optical axis direction to pull the bending portion 21bx obliquely rearwards in a direction away from the optical axis O to prevent the flexible PWB 21b from bending to interfere with the photographing optical path of the zoom lens barrel 1.

Figure 4:
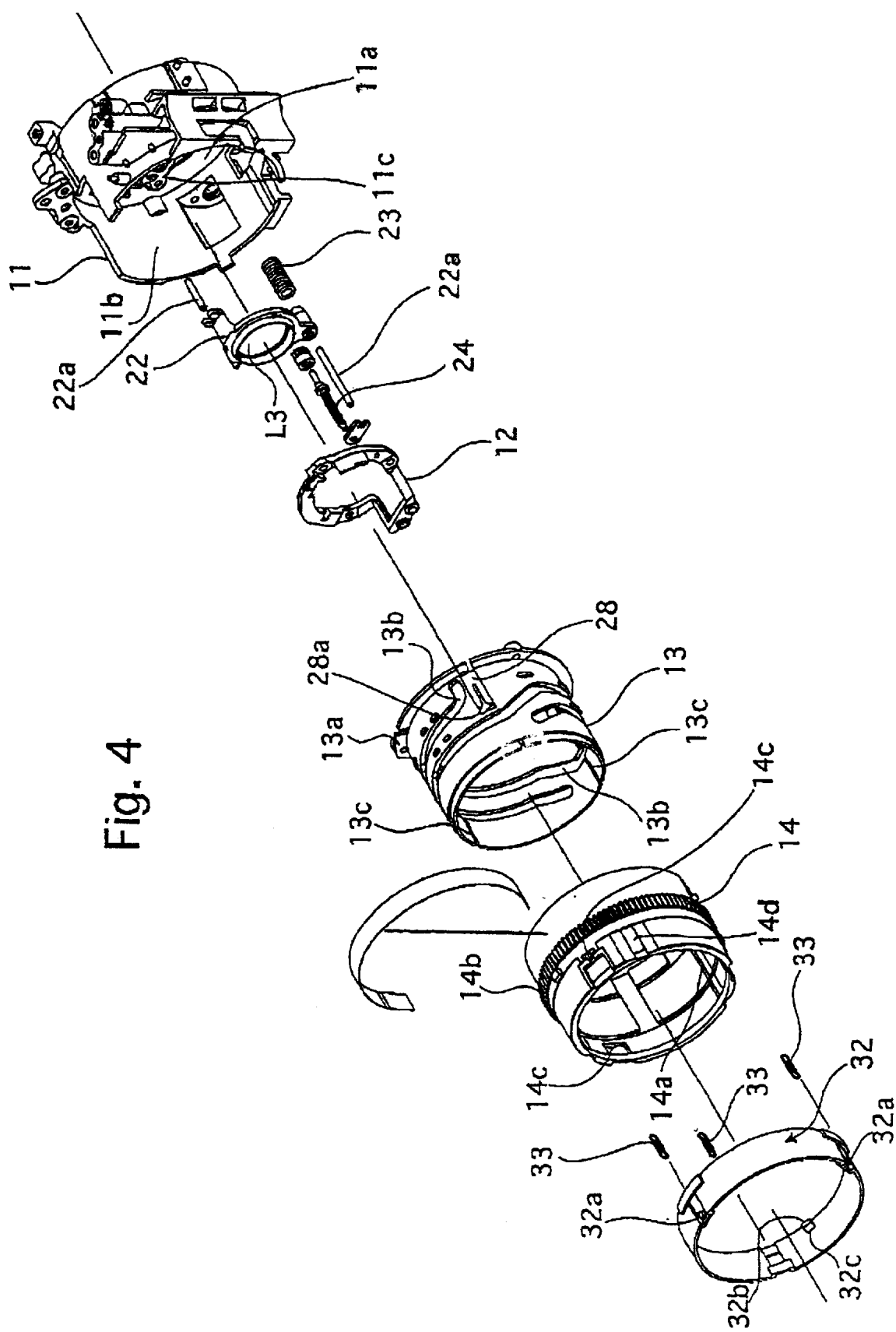
FIG. 4 is an exploded perspective view of a lower right portion of the zoom lens barrel in FIG. 1.

The zoom lens barrel 1 is provided with a third lens frame 22 to which the third lens group L3 is fixed. As shown in FIG. 4, the third lens frame 22 is guided in the optical axis direction via a pair of linear guide rods 22a which extend parallel to the optical axis. The front and rear ends of each linear guide rod 22a are fixed to the shaft holding member 12 and the housing 11, respectively. The third lens frame 22 is driven to move in the optical axis direction by rotation of a feed screw 24 which is driven forwardly and reversely by a step motor (not shown) in accordance with information on a photographing distance.

Figure 8:
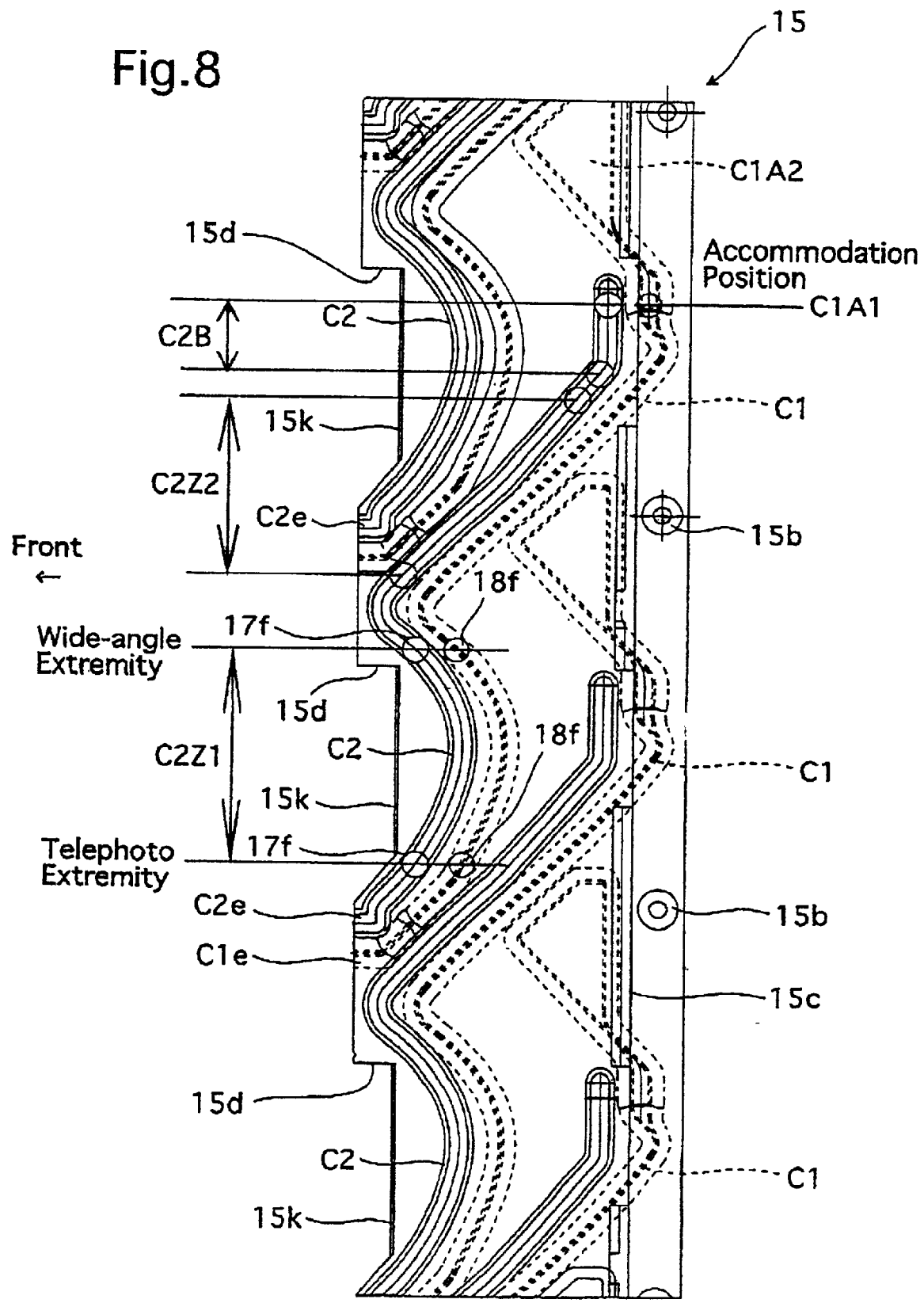
FIG. 8 is a developed view of an outer peripheral surface of a cam ring provided as an element of the zoom lens barrel shown in FIG. 1.
Figure 9:
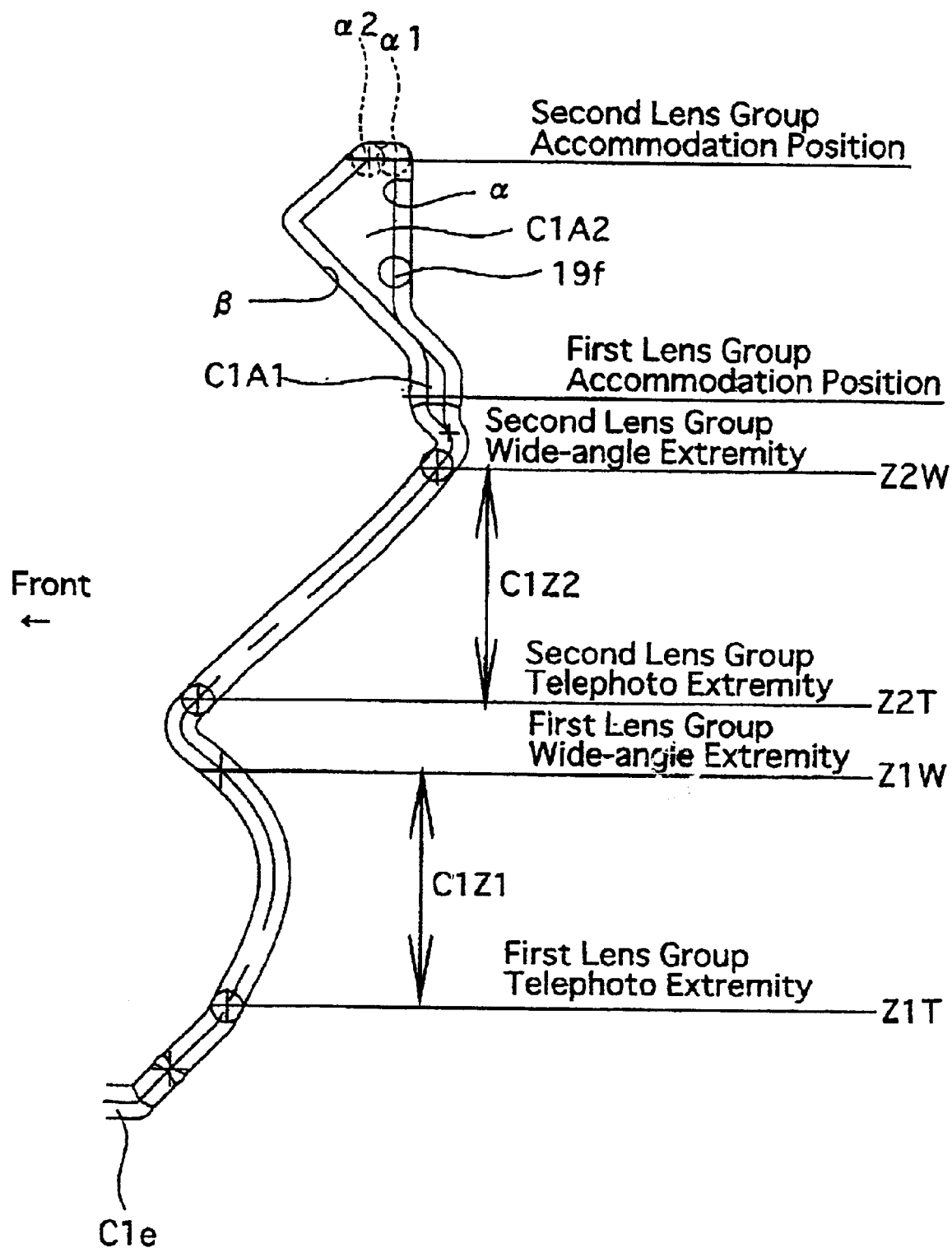
FIG. 9 is a developed view of one of three cam grooves formed on an inner peripheral surface of the cam ring, showing the profile of the cam groove.
Figure 10:
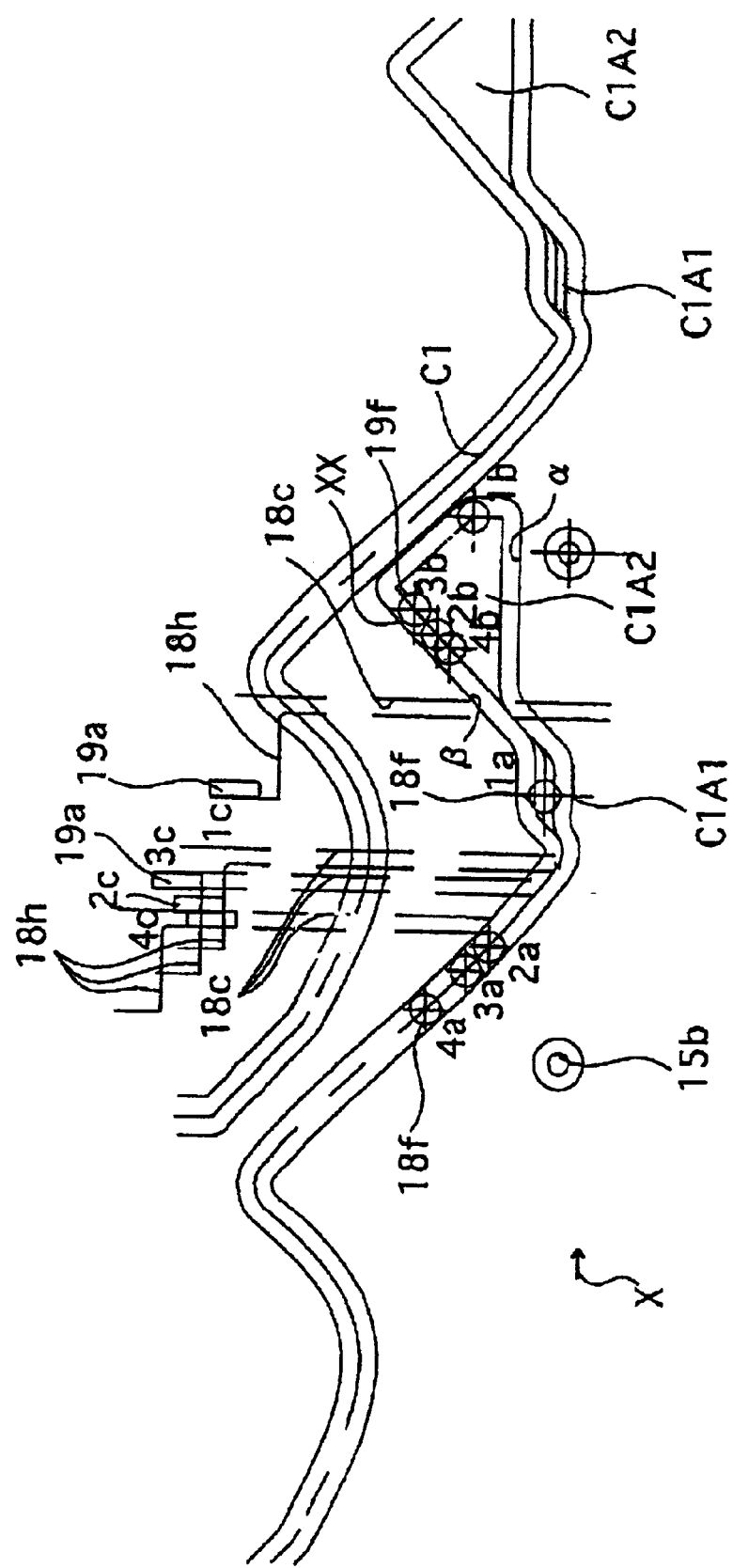
FIG. 10 is a developed view of two of the three cam grooves shown in FIGS. 8 and 9, showing the relationship between the cam grooves, first follower pins formed on a first lens frame, and second follower pins formed on a second lens frame.

A zooming operation is carried out by moving the first and second lens groups L1 and L2 (the first and second lens group moving frames 18 and 19) in the optical axis direction relative to the third lens group L3 while varying the distance therebetween. The cam ring 15 is provided, on an inner peripheral surface thereof at equi-intervals in a circumferential direction of the cam ring 15, with the aforementioned set of three lens-drive cam grooves C1 (see FIGS. 1, 3 and 5). The first lens group moving frame 18 and the second lens group moving frame 19, which are guided linearly in the optical axis direction without rotating about the optical axis O, move in the optical axis direction by rotation of the cam ring 15 in accordance with the profiles of the lens-drive cam grooves C1. The developed view of the lens-drive cam grooves C1 is shown in FIGS. 8 through 10. In FIG. 8 each lens-drive cam groove C1, which is formed on an inner peripheral surface of the cam ring 15, is shown by dotted lines and is shown by solid lines in FIGS. 9 and 10 to clearly indicate the profile thereof. A feature of the zoom lens barrel 1 is that each lens-drive cam groove C1 is formed as a continuous bottomed groove to have respective cam groove portions for the first and second lens groups L1 and L2, and that the first and second lens groups L1 and L2 are released from the constraints of the set of three lens-drive cam grooves C1 at their respective accommodation positions so that the first and second lens groups L1 and L2 can be accommodated to be positioned close to each other until the first lens frame 20 and the second lens group moving frame 19 come into contact with each other.

Namely, the set of three follower pins 18f that are projected radially outwards from the first lens group moving frame 18 and the set of three follower pins 19f that are projected radially outwards from the second lens group moving frame 19 are slidably engaged in the set of three lens-drive cam grooves C1, respectively. Each lens-drive cam groove C1, which is formed as a continuous bottomed groove, has a function to move the first and second lens groups L1 and L2 (the first and second lens group moving frames 18 and 19) in their respective zoom paths. Unlike the present embodiment of the zoom lens barrel 1, in a conventional zoom lens barrel having a cam ring for driving a plurality of movable lens groups, a set of cam grooves is necessary for each of the plurality of movable lens groups.

Each lens-drive cam groove C1 is provided at one end thereof with an insertion end C1e via which one of the three follower pins 18f of the first lens group moving frame 18 and one of the three follower pins 19f of the second lens group moving frame 19 are inserted into the lens-drive cam groove C1. Each lens-drive cam groove C1 is further provided with a first-lens-group zooming section (front lens group moving section) C1Z1, a second-lens-group zooming section (rear lens group moving section) C1Z2, a first-lens-group accommodation section C1A1 and a second-lens-group accommodation section C1A2, in that order from the insertion end C1e. The opposite ends (lower and upper ends as viewed in FIG. 9) of the first-lens-group zooming section C1Z1 determines a telephoto extremity Z1T and a wide-angle extremity Z1W of the first lens group L1, respectively. The opposite ends (lower and upper ends as viewed in FIG. 9) of the second-lens-group zooming section C1Z2 determines a telephoto extremity Z2T and a wide-angle extremity Z2W of the second lens group L2, respectively. As shown in FIGS. 8 through 10, the width of each of the first-lens-group accommodation section C1A1 and the second-lens-group accommodation section C1A2 in the optical axis direction is greater than the width of each the first-lens-group zooming section C1Z1 and the second-lens-group zooming section C1Z2 so that the associated follower pins 18f and 19f can move freely in the first-lens-group accommodation section C1A1 and the second-lens-group accommodation section C1A2, respectively. Namely, the first-lens-group accommodation section C1A1 extends in a circumferential direction of the cam ring 15, and also widens in the optical axis direction to form a clearance for the associated follower pin 18f of the first lens group moving frame 18 to be movable in the optical axis direction by an amount of movement corresponding to the range of adjustment of the thread engagement position of the male thread portion of the first lens frame 20 with respect to the female thread portion 18d of the inner flange 18b. On the other hand, the second-lens-group accommodation section C1A2 extends in both a circumferential direction of the cam ring 15 and the optical axis direction to form a substantially triangular area to form a clearance for the associated follower pin 19f of the second lens group moving frame 19 to be movable freely and widely in both the circumferential direction of the cam ring 15 and the optical axis direction within the triangular area.

The relative angular positions of the set of three follower pins 18f and the set of three follower pins 19f about the optical axis O are determined so that each follower pin 18f and each follower pin 19f are respectively positioned in the first-lens-group accommodation section C1A1 and the second-lens-group accommodation section C1A2 when the cam ring 15 is positioned in an accommodation position thereof. The first-lens-group accommodation section C1A1 and the second-lens-group accommodation section C1A2, to some extent, do not constrain movement of the associated follower pins 18f and 19f, respectively. Namely, each follower pin 18f and each follower pin 19f can move in the first-lens-group accommodation section C1A1 and the second-lens-group accommodation section C1A2, respectively, in the optical axis direction because of the clearance formed between each groove portion and the associated follower pin. This clearance contributes to further miniaturization of the length of the zoom lens barrel 1 in an accommodation state thereof (i.e., the distance between the first lens group moving frame 18 and the second lens group moving frame 19 in the optical axis direction can be minimized since both moving frames 18 and 19 are released from positioning restrictions of the cam grooves and cam followers thereof). The amount of clearance formed between the first-lens-group accommodation section C1A1 and the associated follower pin 18f is sufficient to absorb a variation in position of the associated follower pin 18f which is caused by an adjustment of the thread engagement position of the male thread portion of the first lens frame 20 with respect to the female thread portion 18d of the inner flange 18b in an accommodation state of the zoom lens barrel 1.

The inner flange 17c of the inner ring 17 is provided with a set of three engaging protrusions 17g (only one of which appears in FIGS. 1, 3 and 5) arranged at different angular positions in a circumferential direction of the inner ring 17. The first lens group moving frame 18 is provided with a set of three recesses 18g to correspond to the set of three engaging protrusions 17g. Three helical compression springs 30 serving as a biasing device are inserted to be held between the set of three engaging protrusions 17g and the set of three recesses 18g, respectively, to press the first lens group moving frame 18 rearwards in the optical axis direction. Therefore, the first lens frame 20, which is supported by the first lens group moving frame 18, can retract up to a mechanical contacting point P (see FIGS. 5 and 6) where the first lens frame 20 comes in contact with the light shield ring 19c of the second lens group moving frame 19 due to the clearance between the first-lens-group accommodation section C1A1 of each lens-drive cam groove C1 of the cam ring 15 and the associated follower pin 18f of the first lens group moving frame 18. By providing the helical compression springs 30, which have a small length, in between the inner ring 17 and the first lens group moving frame 18, the relative movement between the first and second lens group moving frames 18 and 19 can be reduced, however, even if the helicoid compression springs 30 are not provided, the first and second lens group moving frames 18 and 19 can still retract up so that the first lens frame 20 contacts the mechanical contacting point P. Likewise, the second lens group moving frame 19 can retract up to a mechanically contacting point Q (see FIGS. 5 and 6) where the second lens group moving frame 19 comes in contact with the third lens frame 22 due to a clearance between the second-lens-group accommodation section C1A2 of each lens-drive cam groove C1 of the cam ring 15 and the associated follower pin 19f of the second lens group moving frame 19. Due to such structures of the mechanical contacting points P and Q, the length of the zoom lens barrel 1 in an accommodation state thereof is successfully reduced as compared with a conventional zoom lens barrel in which the respective accommodation positions of first and second lens groups which correspond to the first and second lens groups L1 and L2 of the present embodiment of the zoom lens barrel are precisely determined by associated cam grooves. Furthermore, the third lens frame 22 can retract up to a mechanical contacting point R where it comes in contact with the housing 11 while compressing a helical compression spring 23 (see FIGS. 1 and 4) which is positioned between the third lens frame 22 and the housing 11 to press the third lens frame 22, forward. The axial cross sectional view of the zoom lens barrel 1 above the optical axis O in each of FIGS. 5, 6 and 7 shows an accommodation state of the zoom lens barrel 1 where the first lens frame 20 is in contact with the light shield ring 19c of the second lens group moving frame 19, where the second lens group moving frame 19 is in contact with the third lens frame 22, and where the third lens frame 22 is in contact with the housing 11. The amount of rearward movement of the first lens group moving frame 18 relative to the second lens group moving frame 19 depends on the position of the first lens frame 20 relative to the first lens group moving frame 18 because the position of the first lens frame 20 relative to the first lens group moving frame 18 varies by an adjustment of the thread engagement position of the male thread portion of the first lens frame 20 with respect to the female thread portion 18d of the inner flange 18b during assembly. Such a variation due to the adjustment is absorbed by extension or compression of the helical compression springs 30 so that the zoom lens barrel 1 can be accommodated with the first lens frame 20, the second lens group moving frame 19 and the third lens frame 22 being in contact with the light shield ring 19c, the third lens frame 22 and the housing 11 at the mechanically contacting points P, Q and R, respectively.

If the cam ring 15 rotates in a direction from the accommodation position toward a ready-to-photograph position in a zooming section between the telephoto extremity Z1T and the wide-angle extremity Z1W thereof, each follower pin 18f of the first lens group moving frame 18 which is engaged in the first-lens-group accommodation section C1A1 moves from the first-lens-group accommodation section C1A1 to the first-lens-group zooming section C1Z1 via the second-lens-group zooming section C1Z2, while each follower pin 19f of the second lens group moving frame 19 which is engaged in the second-lens-group accommodation section C1A2 moves from the second-lens-group accommodation section C1A2 to the second-lens-group zooming section C1Z2 via the first-lens-group accommodation section C1A1. Accordingly, the second-lens-group zooming sections C1Z2 of the set of three lens-drive cam grooves C1 that are used for driving the set of three follower pins 19f of the second lens group moving frame 19 are used as mere passing sections for the set of three follower pins 18f of the first lens group moving frame 18 via which the set of three follower pins 18f move from the first-lens-group accommodation position to the ready-to-photograph position. The above-described structure which provides such passing sections is advantageous to reduce the number of cam grooves which are to be formed on the cam ring 15, which is in turn advantageous to reduce the angle of inclination of each cam groove with respect to a circumferential direction of the cam ring 15.

The inner ring 17 moves in the optical axis direction independent of the first lens group moving frame 18 in a moving path which is substantially identical to the moving path of the first lens group moving frame 18. Accordingly, the cam ring 15 is provided, on an outer peripheral surface at equi-intervals in a circumferential direction thereof, with the aforementioned set of three cam grooves C2. The inner ring 17 is provided, on an inner peripheral surface at equi-intervals in a circumferential direction thereof, with the aforementioned set of three follower pins 17f (only one of them appears in FIG. 5) which are slidably engaged in the set of three cam grooves C2 of the cam ring 15, respectively. As can be seen in FIG. 8, the profiles of the cam grooves C2 resemble those of the lens-drive cam grooves C1. As shown in FIG. 8, each cam groove C2 is provided at one end thereof with an insertion end C2e via which one of the three follower pins 17f of the inner ring 17 is inserted into the cam groove C2. Each cam groove C2 is further provided with a first section C2Z1 which corresponds to the first-lens-group zooming section C1Z1, a second section C2Z2 which corresponds to the second-lens-group zooming section C1Z2, and a barrier drive section C2B. The barrier drive section C2B extends in a circumferential direction of the cam ring 15, so that the cam ring 15 rotates about the optical axis O without moving in the optical axis direction relative to the inner ring 17 as long as each follower pin 17f is engaged in the barrier drive section C2B. As can be clearly seen in FIG. 8, the set of three lens-drive cam grooves C1 and the set of three cam grooves C2 are formed on the cam ring 15 at slightly different positions in the optical axis direction, while the set of three follower pins 17f that are respectively engaged in the set of three cam grooves C2 and the set of three follower pins 18f that are respectively engaged in the set of three lens-drive cam grooves C1 are respectively aligned side by side in a direction parallel to the optical axis O.

By providing the inner ring 17, which extends forward so that an outer peripheral surface thereof is exposed to the outside of the zoom lens barrel 1, as an element separate from the first lens group moving frame 18, and by guiding the inner ring 17 in the optical axis direction via a cam mechanism independent of the first lens group moving frame 18 as described above, external forces applied to the inner ring 17 can be prevented from being transferred to the first lens group L1 via the first lens group moving frame 18, which in turn prevents deterioration in optical performance of the zoom lens barrel 1 due to eccentricity of the optical axis of the first lens group L1. In addition, the structure of the cam ring 15 wherein the set of three lens-drive cam grooves C1 and the set of three cam grooves C2, whose cam profiles are similar (though differing slightly in shape) to each other, are formed on the cam ring 15 in slightly different positions thereon in the optical axis direction does not increase the wall thickness of the cam ring 15; moreover, external forces applied to the inner ring 17 in a direction radially inwards can be received by the first lens group moving frame 18 via the set of three follower pins 18f (i.e., the strength of the whole zoom lens barrel 1 can be reinforced). Furthermore, since the set of three follower pins 17f and the set of three follower pins 18f are respectively aligned side by side in a direction parallel to the optical axis O, the strength of the spring force of the three helical compression springs 30 that are held between the inner ring 17 and the first lens group moving frame 18 to bias the inner ring 17 and the first lens group moving frame 18 in opposite directions away from each other varies little even if the cam ring 15 rotates relative to the inner ring 17 and the first lens group moving frame 18. Namely, since the direction of the helical compression springs 30 and aligned direction of the cam followers 17f and 18f are same and are parallel to the optical axis O, backlash with the cam grooves C1 and the cam followers 17f and backlash with the cam grooves C2 and cam followers 18f are absorbed by the helical compression springs 30, and accordingly, the optical performance of the zoom lens can be reliably maintained wherever the cam followers 17f and 18f are positioned in the cam-grooves C1 and C2 respectively.

The barrier unit 40 is fixed to an inner surface of the main ring body 17r to be positioned therein. The barrier drive ring 31 is positioned in the inner ring 17 and held between the barrier unit 40 and the inner flange 17c of the inner ring 17 to be rotatable freely about the optical axis O. The cam ring 15 is provided at the front end thereof with a set of three recesses 15k. The barrier drive ring 31 is provided on an outer peripheral surface thereof with a set of three recesses 31k, on which a set of three engaging portions 31a are formed on respective surfaces thereof. The cam ring 15 is provided at one end (upper end as viewed in FIG. 8) of each recesses 15k with a rotation transfer face 15d which extends parallel to the optical axis O and extends through a corresponding opening 17z (see FIG. 7) provided on a circumferential portion of the inner flange 17c. If the cam ring 15 rotates about the optical axis O in a barrier closing direction (clockwise as viewed from the front of the zoom lens barrel 1) with respect to the inner ring 17 with the set of three follower pins 17f being respectively engaged within the barrier drive sections C2B of the set of three cam grooves C2 of the cam ring 15, the three rotation transfer faces 15d firstly come into contact with the three engaging portions 31a of the barrier drive ring 31 and subsequently press the three engaging portions 31a to give a rotational force to the barrier drive ring 31 to close a pair of barrier blades 42, respectively. As shown in FIG. 8, the set of three recesses 15k are formed on the cam ring 15 at portions thereon other than the portions where the three lens-drive cam grooves C1 and the three cam grooves C2 are formed.

Figure 12:
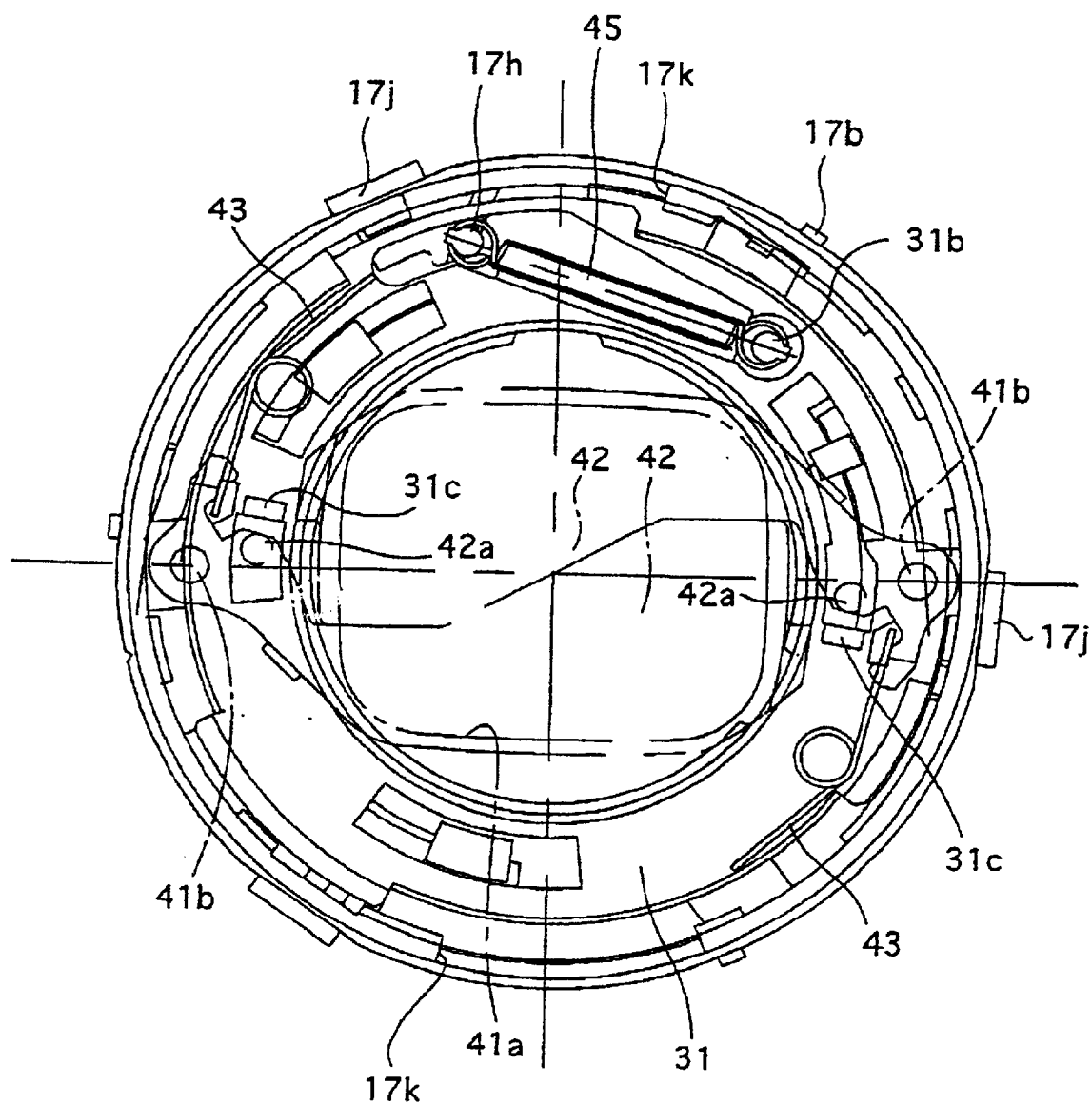
FIG. 12 is a front elevational view of the zoom lens barrel with a barrier blade support front plate removed therefrom in a state where a pair of lens barrier blades are closed.
Figure 13:
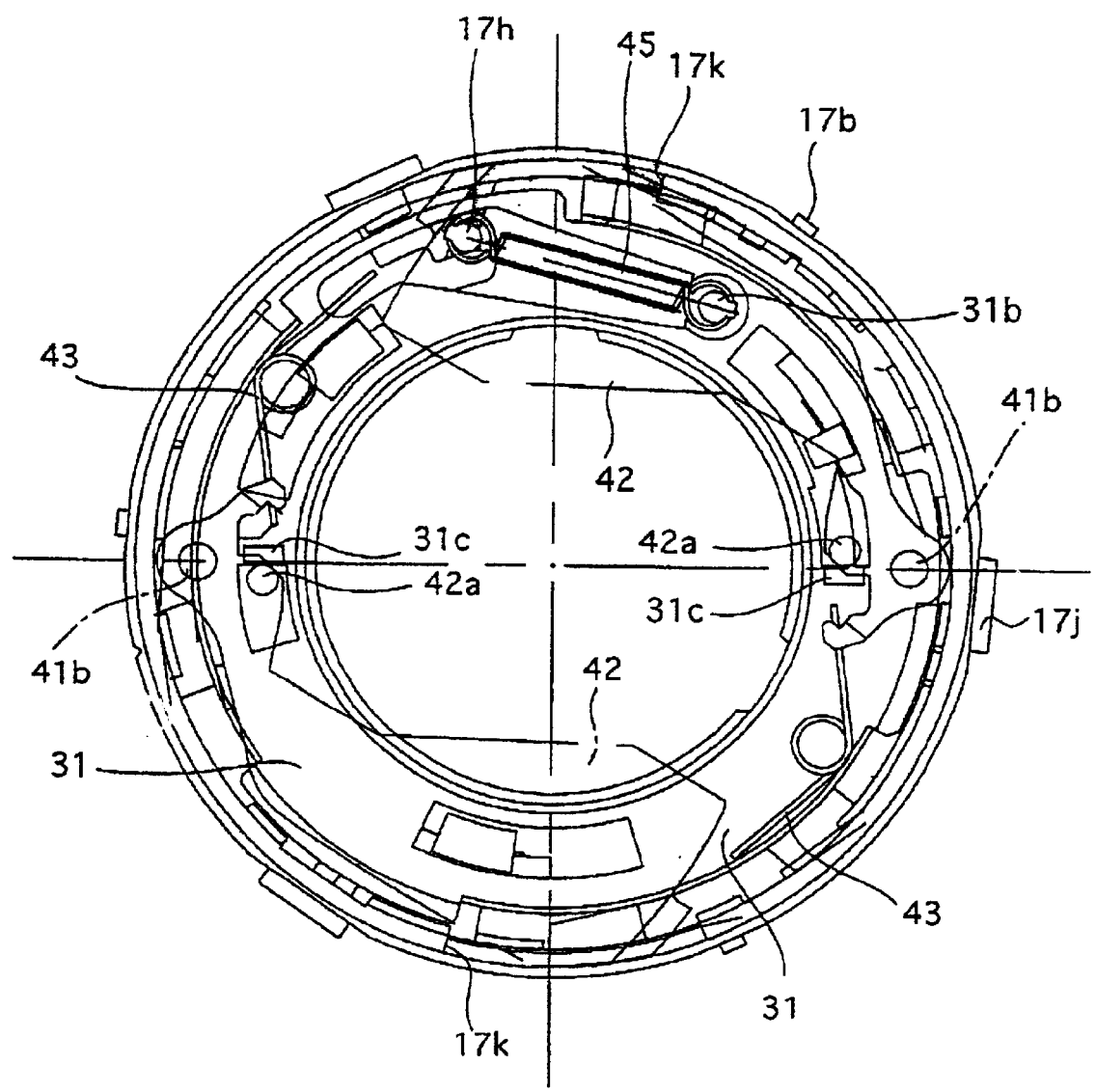
FIG. 13 is a view similar to that of FIG. 12 and illustrates the barrier drive ring and peripheral elements thereof in a state where the pair of lens barrier blades are open.
Figure 14:
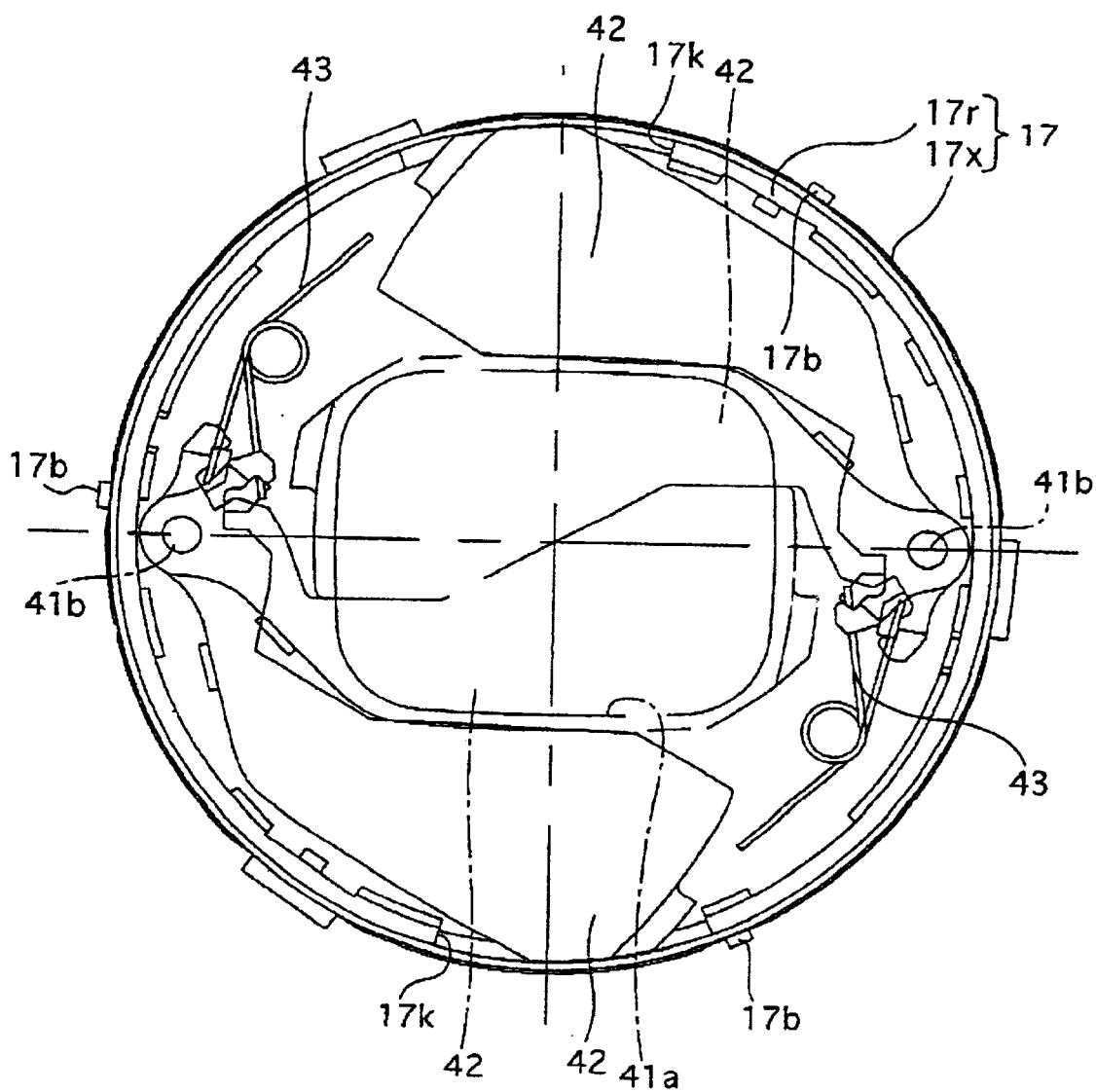
FIG. 14 is a view similar to that of FIG. 12 and illustrates the pair of barrier blades of a barrier unit, showing the relationship between the pair of barrier blades and an inner ring.

As shown in FIGS. 2 and 14, the barrier unit 40 is provided with a barrier blade support front plate (front end exterior plate) 41, the pair of barrier blades 42, two torsion springs 43 and a barrier blade support rear plate 44, and is formed as a single assembly in advance. The barrier blade support front plate 41 is provided at the center thereof with a substantially rectangular photographing aperture 41a, and is further provided, on an rear surface thereof on opposite sides of the photographing aperture 41a, with two bosses 41b, respectively, which extend rearwards. Each barrier blade 42 is provided at one end thereof with a hole in which one of the two bosses 41b is engaged so that each barrier blade 42 is rotatable about the associated boss 41b. The two torsion springs 43 bias the pair of barrier blades 42 to rotate in opposite rotational directions to shut the pair of barrier blades 42, respectively. The pair of barrier blades 42 are supported between the barrier blade support front plate 41 and the barrier blade support rear plate 44. The barrier blade support rear plate 44 is provided at the center thereof with a central aperture 44b (see FIG. 2) thereof which is aligned with the photographing aperture 41a in the optical axis direction, and is further provided on opposite sides of the central aperture with two slots 44a. As shown in FIGS. 12 and 13, each barrier blade 42 is provided in the vicinity of the associated boss 41b with an engaging projection 42a which extends rearward, toward the barrier drive ring 31, to pass through the associated slot 44a of the barrier blade support rear plate 44. The barrier drive ring 31 is provided on left and right sides of a central opening thereof with two drive projections 31c which are respectively engaged with the two engaging projections 42a of the pair of barrier blades 42. FIG. 12 shows the pair of barrier blades 42 with chain lines in a closed state thereof, and FIG. 13 shows the pair of barrier blades 42 with chain lines in a fully open state thereof. FIG. 14 shows fundamental elements of the barrier unit 40 with the barrier blade support front plate 41 removed.

The barrier drive ring 31 is biased to rotate in a direction to open the pair of barrier blades 42 by a helical extension spring 45 whose opposite ends are hooked on an engaging projection 31b formed on the barrier drive ring 31 and an engaging projection 17h formed on a front surface of the inner flange 17c of the inner ring 17. The spring force of the helical extension spring 45 is greater than the total spring force of the two torsion springs 43. The two drive projections 31c of the barrier drive ring 31 come into contact with the two engaging projections 42a of the pair of barrier blades 42 to open the pair of barrier blades 42, respectively, when the barrier drive ring 31 is in a fully rotated position thereof by the spring force of the helical extension spring 45 (see FIG. 13). If the barrier drive ring 31 is rotated in a direction to close the pair of barrier blades 42 against the spring force of the helical extension spring 45, the two drive projections 31c respectively move away from the two engaging projections 42a of the pair of barrier blades 42 so that the pair of barrier blades 42 are closed by the spring force of the two torsion springs 43 (see FIG. 12).

The three rotation transfer faces 15d of the cam ring 15 respectively come into contact with the three engaging portions 31a of the barrier drive ring 31 to press the three engaging portions 31a against the spring force of the helical extension spring 45 to rotate the barrier drive ring 31. When the cam ring 15 is in the accommodation position thereof, the three rotation transfer faces 15d are respectively in contact with the three engaging portions 31a of the barrier drive ring 31 via three through-slots 17z formed on the inner flange 17c of the inner ring 17. The barrier drive ring 31 is rotated about the optical axis O against the spring force of the helical extension spring 45 to close the pair of barrier blades 42. If the cam ring 15 rotates about the optical axis O in a barrier opening direction (counterclockwise as viewed from the front of the zoom lens barrel 1) with respect to the inner ring 17 with the set of three follower pins 17f being respectively engaged within the barrier drive sections C2B of the set of three cam grooves C2 of the cam ring 15, the three rotation transfer faces 15d are respectively disengaged from the three engaging portions 31a of the barrier drive ring 31 so that the barrier drive ring 31 is rotated in a direction to open the pair of barrier blades 42 by the spring force of the helical extension spring 45.

Figure 16:
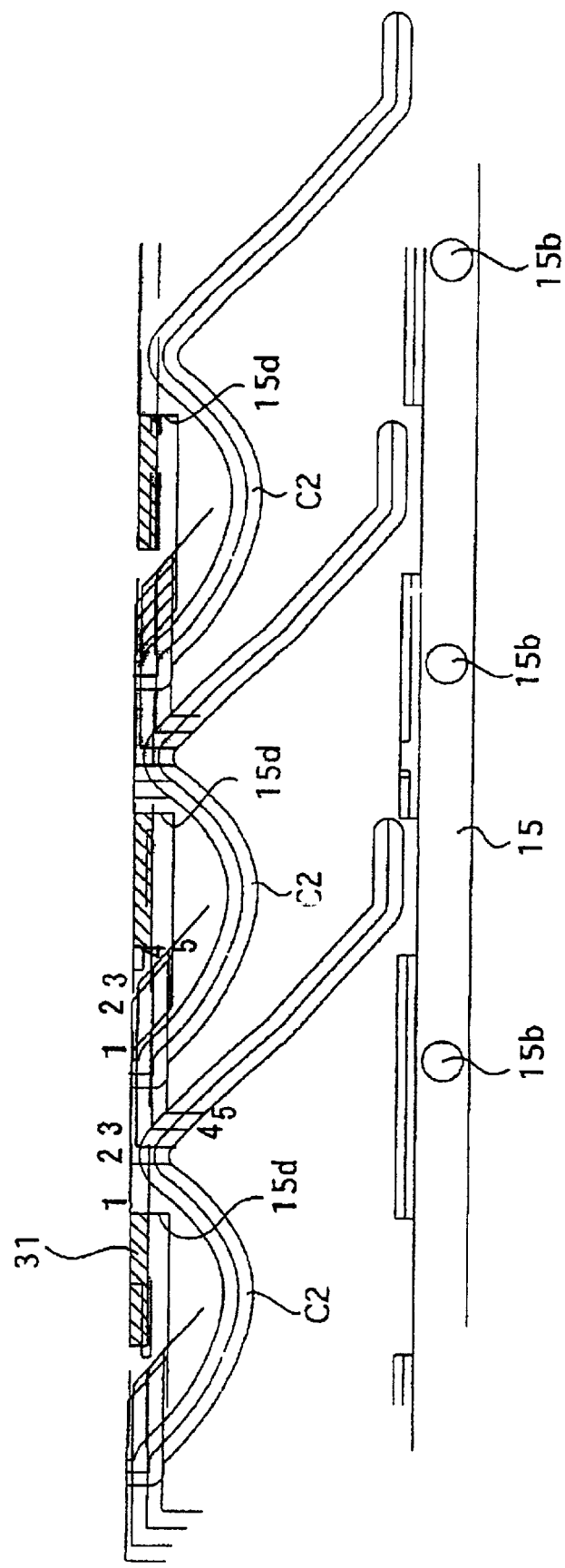
FIG. 16 is a developed view of the cam ring and the barrier drive ring, showing the positional relationship therebetween.

FIG. 16 shows the movement of the three rotation transfer faces 15d of the cam ring 15 in the case where the cam ring 15 rotates so that each follower pin 15b, which is engaged in the associated cam slot 13b of the stationary ring 13, moves from the linear slot portion 13b1 to the state-changing slot portion 13b2 of the associated cam slot 13b, i.e., from the accommodation position to the preparation section (see FIG. 11). Due to the engagement of the set of three follower pins 15b of the cam ring 15 with the set of three cam slots 13b and the set of three rotation transfer grooves 14a, the cam ring 15 firstly rotates about the optical axis O while moving in the optical axis direction (each rotation transfer face 15d moves from a position "1—1" to a position "4—4" via positions "2—2" and "3—3" in FIG. 16), and subsequently rotates about the optical axis O without moving in the optical axis direction (each rotation transfer face 15d moves from the position "4—4" to a position "5—5" in FIG. 16). When moving from the position "4—4" to the position "5—5", the three rotation transfer faces 15d of the cam ring 15 are respectively disengaged from the three engaging portions 31a of the barrier drive ring 31 to thereby open the pair of barrier blades 42 by the spring force of the helical extension spring 45. Conversely, if the cam ring 15 rotates so that each follower pin 15b moves from the preparation section to the accommodation position, the movement of each rotation transfer face 15d from the position "5—5" to the position "4—4" causes the pair of barrier blades 42 to close.

Figure 17:
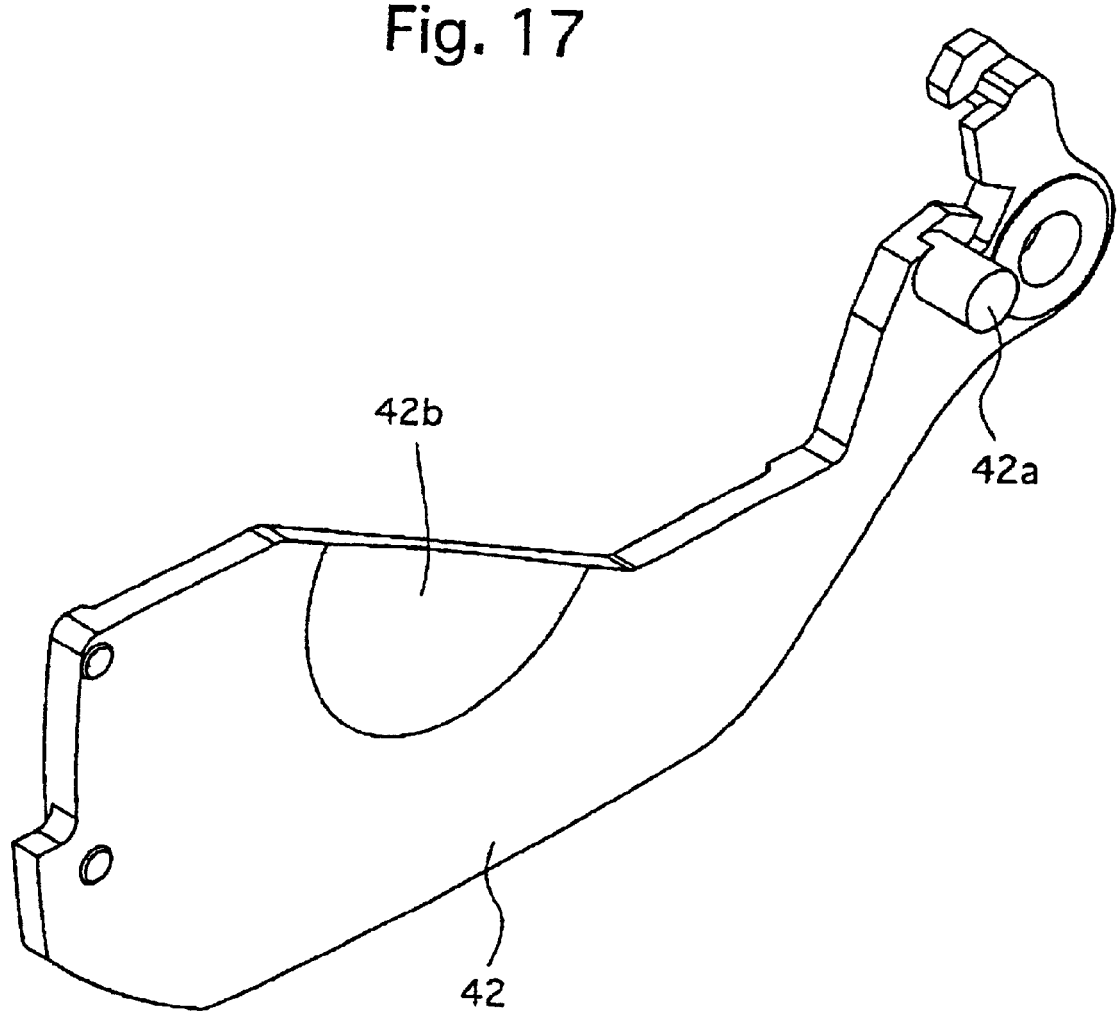
FIG. 17 is an enlarged perspective view of a lens barrier blade shown in FIGS. 1 and 2.

Each of the pair of barrier blades 42 is formed as a substantially plane plate, and is provided on a rear face thereof with a semi-circular concave face 42b (see FIGS. 5, 6 and 17) so that the rear face of each barrier blade 42 does not come in contact with a frontmost surface (convex surface) L1r of the first lens group L1. The two semi-circular concave faces 42b together form a circular concave face the shape of which corresponds to the shape of a central portion of the convex frontmost surface L1r of the first lens group L1 in a state where the pair of barrier blades 42 are closed. The curvature of each semi-circular concave face 42b is determined to corresponds to the curvature of the frontmost surface L1r of the first lens group L1. The concave faces 42b of the pair of barrier blades 42 make it possible to retreat the inner ring 17 to a rearward limit when the inner ring 17 is accommodated. The concave face 42b is formed on each barrier blade 42 when the barrier blades 42 are molded of synthetic resin.

After the reinforcing ring 17x is fitted on and adhered to the main ring body 17r, the barrier unit 40 having the above described structure is fitted into the reinforcing ring 17x from the front thereof. The barrier blade support front plate 41 is provided on an outer peripheral edge thereof with a plurality of engaging portions which are respectively engaged with a corresponding plurality of hooks formed on an inner peripheral surface of the main ring body 17r in front of the inner flange 17c to prevent the barrier unit 40 from coming off the front of the inner ring 17. The barrier drive ring 31 is held between the barrier unit 40 and the inner flange 17c of the inner ring 17 to be rotatable about the optical axis O. The main ring body 17r, which is made of synthetic resin, is provided, at the front end thereof on opposite sides of the central circular opening of the main ring body 17r, with two cutout portions (recesses/openings) 17k (see FIG. 14) in which respective outer edges of the pair of barrier blades 42 enter when the pair of barrier blades 42 are fully opened as shown in FIG. 14. The radially outer ends of the two cutout portions 17k are fully covered by the reinforcing ring 17x. The main body ring 17r can be provided with the two cutout portions 17k each formed as a through hole in a radial direction of the inner ring 17 due to the structure wherein the inner ring 17 is constructed from two separate elements: the synthetic-resin-made main body ring 17r and the metal reinforcing ring 17x. Conventionally, if a set of barrier blades such as the pair of barrier blades 42 of the zoom lens barrel 1 is designed to consist of four blades, the total thickness of the four blades in the optical axis direction increases though the radial width of each blade is reduced. Conversely, if the set of barrier blades is designed to consist of one or two barrier blades, though the total thickness of the blade or blades in the optical axis direction is reduced, the radial width of each blade increases. However, in the present embodiment of the zoom lens barrel 1, the formation of the two cutout portions 17k on the main body ring 17r that serve as recesses for the pair of barrier blades 42 contributes to further miniaturization of the diameter of the inner ring 17 without increasing the total thickness of the barrier blades 42 in the optical axis direction.

As has been described above, the zooming slot portion 13b3 of each cam slot 13b of the stationary ring 13 extends in a circumferential direction of the stationary ring 13 and does not extend in the optical axis direction. Therefore, the set of three follower pins 15b of the cam ring 15 rotate about the optical axis O without moving in the optical axis direction when following the zooming slot portions 13b3 of the set of three cam slots 13b in the zooming section (see FIG. 11). The zoom lens barrel 1 is provided between the housing 11 and the rotatable ring 14 with a biasing ring 32 which is fitted on a front part of the rotatable ring 14 to remove backlash and play between the set of three follower pins 15b and the zooming slot portions 13b3 of the set of three cam slots 13b. The biasing ring 32 and the rotatable ring 14 are provided with three hooks 32a and corresponding three hooks 14c, respectively. Opposite ends of three helical extension springs 33 are hooked on the three hooks 32a and the three hooks 14c, respectively, to constantly bias the biasing ring 32 rearwards in the optical axis direction. The biasing ring 32 is provided, on an inner peripheral surface thereof at equi-angular intervals in a circumferential direction of the biasing ring 32, with a set of three inward projections 32c which extend radially inwards, while the rotatable ring 14 is provided in the vicinity of the front end thereof with a corresponding set of three through-slots 14d which extend parallel to the optical axis O so that the set of three inward projections 32c penetrate the rotatable ring 14 via the set of three through-slots 14d in radially inward directions, respectively. The set of three through-slots 14d are formed on the rotatable ring 14 so as to be communicatively connected in front portions of the set of three rotation transfer grooves 14a to penetrate therethrough, so that the set of three inward projections 32c are positioned in front of the set of three follower pins 15b that are engaged in the set of three rotation transfer grooves 14a, respectively. If each follower pin 15b of the cam ring 15 moves from the state-changing slot portion 13b2 to the zooming slot portion 13b3, respective rear faces of the set of three inward projections 32c come into pressing contact with the set of three follower pins 15b to press each follower pin 15b rearward in the optical axis direction against the rear side edge of the associated zooming slot portion 13b3 to thereby remove backlash and play between the set of three follower pins 15b and the zooming slot portions 13b3 of the set of three cam slots 13b.

In addition to the above described structures wherein the set of three linear guide grooves 18c are formed on an inner peripheral surface of the first lens group moving frame 18 while the set of three linear guide keys 19a, which are respectively engaged in the set of three linear guide grooves 18c, are formed on an outer peripheral surface of the second lens group moving frame 19, a set of three circumferential recesses 18h are formed on the first lens group moving frame 18 at the front ends of the set of three linear guide grooves 18c, respectively. Each circumferential recess 18h allows the associated linear guide key 19a of the second lens group moving frame 19 to move therein in a circumferential direction about the optical axis O, i.e., allows the second lens group moving frame 19 to rotate about the optical axis O relative to the first lens group moving frame 18 in a range corresponding to the circumferential length of the circumferential recess 18h. The second lens group moving frame 19 can rotate about the optical axis O relative to the first lens group moving frame 18 along the three circumferential recesses 18h only when the second lens group moving frame 19 is in the vicinity of the accommodation position thereof. The first lens group moving frame 18 is provided on the inner flange 18b thereof with a set of three circumferential slots 18j (see FIGS. 3 and 6). The second lens group moving frame 19 is provided at the front end thereof with a set of three front projecting portions 19e on respective outer surfaces of which the three linear guide keys 19a are formed, respectively. When each linear guide key 19a is positioned in the associated circumferential recess 18h, i.e., when the second lens group L2 is in the vicinity of the accommodation position thereof, the set of three front projecting portions 19e of the second lens group moving frame 19 penetrates through the inner flange 18b of the first lens group moving frame 18 to project forward from the inner flange 18b via the set of three circumferential slots 18j, respectively. Accordingly, by allowing the three linear guide keys 19a to project forward from the inner flange 18b through the three circumferential slots 18j, respectively, the length in the optical axis direction of the three linear guide grooves 18c and the circumferential recesses 18h which reliably carry out the engaging and disengaging of the three linear guide keys 19a with the three linear guide grooves 18c, and the amount of movement of the first and second lens group moving frames 18 and 19 in the optical axis direction can be maintained without increasing the combined length of the first and second lens group moving frames 18 and 19 at the accommodation positions thereof. The reason why the second lens group moving frame 19 is allowed to rotate relative to the first lens group moving frame 18 along the three circumferential recesses 18h only when the second lens group moving frame 19 is in the vicinity of the accommodation position thereof will be hereinafter discussed.

In a state where the zoom lens barrel 1 is in an accommodation state, i.e., where each of the set of three follower pins 18f of the first lens group moving frame 18 is engaged in the first-lens-group accommodation section C1A1 of the associated lens-drive cam groove C1, a rotation of the cam ring 15 in a direction to extend the zoom lens barrel 1 (in a direction indicated by an arrow "X" in FIG. 10, i.e., counterclockwise as viewed from the front of the zoom lens barrel 1) causes each follower pin 18f of the first lens group moving frame 18 to move from the first-lens-group accommodation section C1A1 to the second-lens-group zooming section C1Z2 of the associated lens-drive cam groove C1, to thereby cause the first lens group moving frame 18 to move forward in the optical axis direction. Such a movement of each follower pin 18f of the first lens group moving frame 18 is indicated stepwise by first, second, third and fourth positions "1a", "2a", "3a" and "4a" in FIG. 10. Likewise, the corresponding movement of each follower pin 19f of the second lens group moving frame 19 is indicated stepwise by first, second, third and fourth positions "1b", "2b", "3b" and "4b" in FIG. 10, while the corresponding movement of each linear guide key 19a of the second lens group moving frame 19 is indicated stepwise by first, second, third and fourth positions "1c", "2c", "3c" and "4c" in FIG. 10.

In addition, such a rotation of the cam ring 15 in the direction X shown in FIG. 10 causes each follower pin 19f of the second lens group moving frame 19 which is positioned in the second-lens-group accommodation section C1A2 of the associated lens-drive cam groove C1 to move from the position "1b" to the position "2b" in the second-lens-group accommodation section C1A2 to come into contact with a surface XX of an inclined side edge β of the second-lens-group accommodation section C1A2 which is inclined with respect to a circumferential direction of the cam ring 15. The position "2b" in the second-lens-group accommodation section C1A2 is positioned on the inclined side edge 13 of the second-lens-group accommodation section C1A2.

A further rotational movement of the cam ring 15 in the same direction X causes each follower pin 19f of the second lens group moving frame 19 to slide on the surface XX of the inclined side edge 13 in a direction inclined to both the optical axis direction and the circumferential direction of the cam ring 15 in a manner such as the following.

At this time, each linear guide key 19a is in contact with a side surface (the lower surface as viewed in FIG. 10) of the associated circumferential recess 18h of the first lens group moving frame 18 (see the position "2c" of the linear guide key 19a shown in FIG. 10). Therefore, a forward movement of the first lens group moving frame 18 in the optical axis direction causes the first lens group moving frame 18 to push the second lens group moving frame 19 forward in the optical axis direction via the circumferential recesses 18h and the set of three linear guide keys 19a, and at the same time, causes the second lens group moving frame 19 to rotate about the optical axis O relative to the first lens group moving frame 18 due to the sliding movement of each follower pin 19f of the second lens group moving frame 19 on the surface XX of the inclined side edge from the position "2b" to the position "3b". Namely, each linear guide key 19a moves from the associated circumferential recess 18h toward the associated linear guide groove 18c while sliding on the side surface (the lower surface as viewed in FIG. 10) of the associated circumferential recess 18h.

Accordingly, if the second lens group moving frame 19 is rotated relative to the first lens group moving frame 18, the first lens group moving frame 18 can move forward smoothly without interfering with the second lens group moving frame 19.

Thereafter, each linear guide key 19a comes into contact with a side edge (the right side edge as viewed in FIG. 10) of the associated linear guide groove 18c of the first lens group moving frame 18 to thereby stop the rotation of the second lens group moving frame 19 (see the position "3c"). At this time, each linear guide key 19a is ready to enter the associated linear guide groove 18c of the first lens group moving frame 18, so that a further forward movement of the first lens group moving frame 18 causes the set of three linear guide key 19a to enter the set of three linear guide grooves 18c, respectively. After the set of three linear guide keys 19a have respectively entered the set of three linear guide grooves 18c, the second lens group moving frame 19 is prevented from rotating about the optical axis O relative to the first lens group moving frame 18 by engagement of each linear guide key 19a with the associated linear guide groove 18c, while each follower pin 19f of the second lens group moving frame 19 slides on the surface XX of the inclined side edge β from the position "3b" to "4b", which causes the second lens group moving frame 19 to move linearly in a direction opposite to the direction of movement of the first lens group moving frame 18 (see the position "4b" in FIG. 10).

Further rotational movement of the cam ring 15 causes each follower pin 19f of the second lens group moving frame 19 to enter the first-lens-group accommodation section C1A1 of the associated lens-drive cam groove C1. Thereafter, if the cam ring 15 rotates in the direction X, the first and second lens group moving frames 18 and 19 move linearly in the optical axis direction in accordance with the respective sections of the set of three lens-drive cam grooves C1 while the second lens group moving frame 19 is guided linearly in the optical axis direction by the first lens group moving frame 18. As can be understood from the above description, the substantially triangular shaped second-lens-group accommodation section C1A2 of each lens-drive cam groove C1 not only secures a clearance for the associated follower pin 19f to be movable freely in both the circumferential direction of the cam ring 15 and the optical axis direction within the triangular area, but also makes the second lens group moving frame 19 rotate relative to the first lens group moving frame 18 to lead each linear guide key 19a to a position so as to be engaged in the associated linear guide groove 18c. Moreover, the substantially triangular shaped second-lens-group accommodation section C1A2 of each lens-drive cam groove C1 allows the first and second lens group moving frames 18 and 19 move in opposite directions in the optical axis direction to ensure the proper engagement of the first lens group moving frame 18 with the second lens group moving frame 19.

On the other hand, in a state where the zoom lens barrel 1 is in a ready-to-photograph state, if the cam ring 15 rotates in a direction to retract the zoom lens barrel 1, i.e., in a direction opposite to the direction X, each follower pin 18f and each follower pin 19f return to the first-lens-group accommodation section C1A1 and the second-lens-group accommodation section C1A2, respectively.

The movement of each follower pin will be hereinafter discussed in detail. After passing the first-lens-group accommodation section C1A1, each follower pin 19f slides on the surface of a rear side edge α of the second-lens-group accommodation section C1A2 to move rightward with respect to FIG. 10. Upon reaching a position on the surface of the rear side edge α immediately before an end α1 (the upper end as viewed in FIG. 9) thereof, each linear guide key 19a comes out of the associated linear guide groove 18c to enter the associated circumferential recess 18h, to thereby allow rotation of the second lens group moving frame 19 relative to the first lens group moving frame 18 possible. Thereafter, each follower pin 19f reaches the end α1 of the rear side edge α to rotate about the optical axis O together with the cam ring 15, namely, the second lens group moving frame 19 rotates about the optical axis O relative to the first lens group moving frame 18. Thereafter, since the cam ring 15 retreats in the optical axis direction (in the rightward direction with respect to FIG. 9) due to the engagement of the set of three follower pins 15b with the linear slot portions 13b1 of the set of three cam slots 13b of the stationary ring 13, each follower pin 19f finally reaches a terminal α2 in the vicinity of the end α1 of the rear side edge α. In this manner, the first and second lens group moving frames 18 and 19 move to the respective accommodation positions smoothly.

Assuming that the second lens group moving frame 19 is moved to the accommodation position thereof with the second lens group moving frame 19 being guided only linearly in the optical axis direction in a manner similar to that of the first lens group moving frame 18, each of the three lens-drive cam grooves C1 has to be formed longer in a circumferential direction of the cam ring 15 (i.e., in an upward direction from the end α1 of the rear side edge α as viewed in FIG. 9). However, if the set of three lens-drive cam grooves C1 are simply formed longer, theses grooves interfere with other cam grooves (e.g., the cam grooves C2). To prevent this problem from occurring, the diameter of the cam ring 15 has to be increased. However, according to the present embodiment of the zoom lens barrel 1, the portion of each of the three lens-drive cam groove C1 which is used to accommodate the second lens group moving frame 19 can be designed short in a circumferential direction of the cam ring 15 within a range in which none of the three lens-drive cam grooves C1 interfere with other cam grooves. This contributes to further miniaturization of the diameter of the cam ring 15.

Since the second-lens-group accommodation section C1A2 of each lens-drive cam groove C1 is formed having a substantially triangular shape, each lens-drive cam groove C1 is successfully formed as a short cam groove, which would need to be longer if formed as a linear cam groove. In addition, by forming each lens-drive cam groove C1 as a short groove in such a manner, the set of three lens-drive cam grooves C1 can be formed on the cam ring 15 with little inclination with respect to the circumferential direction of the cam ring 15. Additionally, when the first and second lens group moving frames 18 and 19 move forward from the respective accommodation positions in the optical axis direction, each follower pin 19f moves in the second-lens-group accommodation section C1A2 from the position "1b" to the position "4b" via the positions "2b" and "3b" in the above described manner while the second lens group moving frame 19 rotates about the optical axis O relative to the first lens group moving frame 18 because each lens-drive cam groove C1 is provided with the substantially triangular shape second-lens-group accommodation section C1A2.

Figure 15:
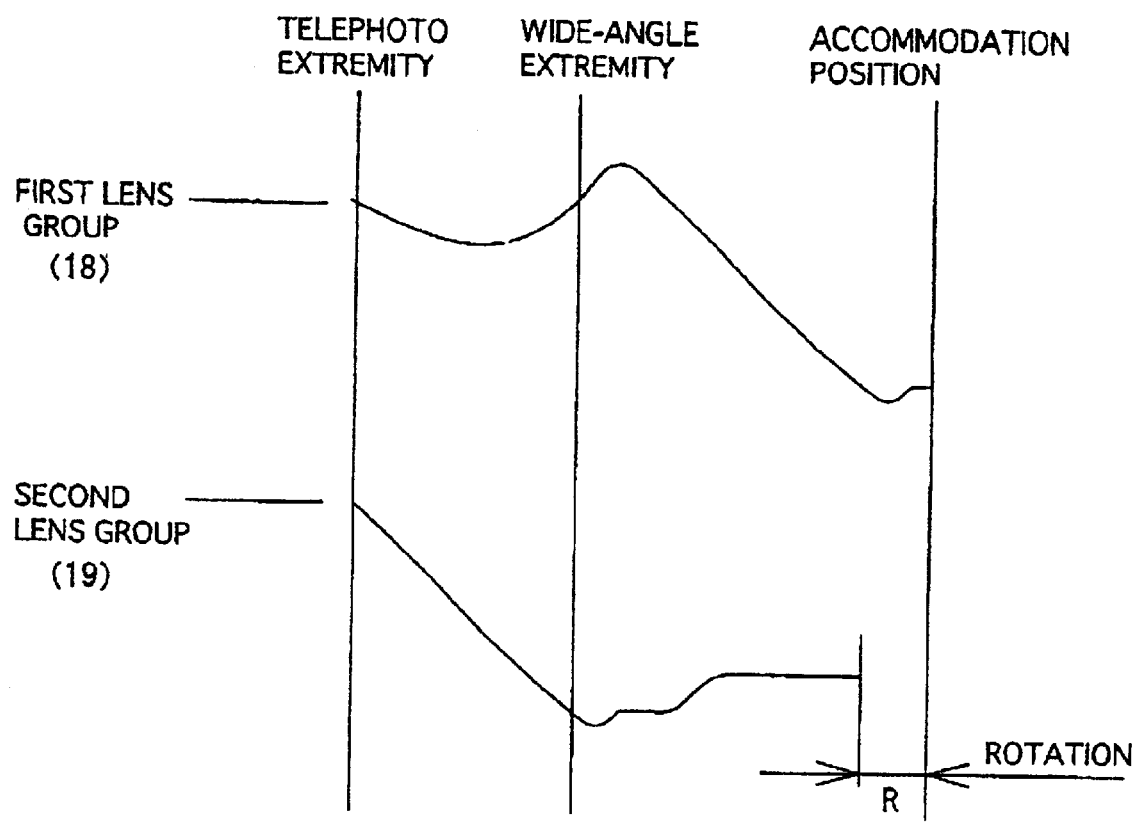
FIG. 15 is a graph showing variations of respective axial positions of first and second lens groups (first and second lens frames) in a range of movement including a zooming section and a retracting section.

FIG. 15 shows the variation in the respective axial positions of first and second lens group moving frames 18 and 19 in a range of movement including a zooming section (between telephoto extremity and wide-angle extremity) and a retracting section (between wide-angle extremity and accommodation position). As can be understood from FIG. 15, the axial position of the first lens group moving frame 18 corresponds to the rotational position (angular position) of the cam ring 15 about the optical axis O due to the profile of each lens-drive cam groove C1, while the second lens group moving frame 19 rotates about the optical axis O relative to the cam ring 15 in a range R shown in FIG. 15.

Friction produced between the light shield ring 19c of the second lens group moving frame 19 and the first lens frame 20 becomes a problem if the second lens group moving frame 19 rotates relative to the first lens group moving frame 18 in the accommodation position because the first lens frame 20, which is supported by the first lens group moving frame 18, is in contact with the light shield ring 19c at the mechanically contacting point P (see FIGS. 5 and 6). Such friction may cause the first lens frame 20 to rotate relative to the first lens group moving frame 18 to thereby deviate in the optical axis direction relative to the first lens group moving frame 18 because the male thread portion of the first lens frame 20 is in mesh with the female thread portion 18d of the inner flange 18b. To prevent such deviation of the axial position of the first lens frame 20 from occurring, the light shield ring 19c is provided, on a front surface thereof with which a rear face of the first lens frame 20 comes into contact, with a low-frictional sheet 26 (see FIGS. 5, 6 and 7) which can be made of, e.g., a tetrafluoroethylene resin.

The overall movement of the zoom lens barrel 1, having the above described structure, from the accommodation position to a ready-to-photograph position (a position in the zooming section) will be hereinafter discussed. When the zoom lens barrel 1 is in an accommodation state, the first lens frame 20 which is supported by the first lens group moving frame 18, which is biased rearward by the three helical compression springs 30, is retracted to the mechanically contacting point P where the first lens frame 20 comes in contact with the light shield ring 19c of the second lens group moving frame 19 due to the clearance between the first-lens-group accommodation section C1A1 of each lens-drive cam groove C1 of the cam ring 15 and the associated follower pin 18f of the first lens group moving frame 18. The second lens group moving frame 19 is also retracted to the mechanically contacting point Q where the second lens group moving frame 19 comes in contact with the third lens frame 22 due to the clearance between the second-lens-group accommodation section C1A2 of each lens-drive cam groove C1 of the cam ring 15 and the associated follower pin 19f of the second lens group moving frame 19. Furthermore, the third lens frame 22 is retracted to the mechanically contacting point R wherein the third lens frame 22 comes in contact with the housing 11 by the spring force of the helical compression spring 23 which presses the third lens frame 22 forward. With these three mechanical contacts at the mechanically contacting points P, Q and R, the length of the zoom lens barrel 1 in an accommodation state of the zoom lens barrel 1 is successfully reduced. When the zoom lens barrel 1 is in an accommodation state, the pair of barrier blades 42 are closed to shut the photographing aperture 41a (see FIG. 12), since the three rotation transfer faces 15d respectively press the three engaging portions 31a of the barrier drive ring 31 against the spring force of the helical extension spring 45 to rotate the barrier drive ring 31 in a direction to move the two drive projections 31c away from the two engaging projections 42a of the pair of barrier blades 42, respectively.

In the accommodation state of the zoom lens barrel 1, if the rotatable ring 14 rotates in a direction to extend the zoom lens barrel 1 relative to the stationary ring 13, the cam ring 15 which is provided with the set of three follower pins 15b, moves in the optical axis direction without rotating about the optical axis O due to the engagement of the follower pins 15b of the cam ring 15 with the inclined groove portions 14a2 of the rotatable ring 14 and the linear slot portions 13b1 of the stationary ring 13 (see FIG. 11). This linear movement of the cam ring 15 causes a side edge of the first-lens-group accommodation section C1A1 of each lens-drive cam groove C1 to push the associated follower pin 18f forward, and at the same time, causes a side edge of the second-lens-group accommodation section C1A2 of each lens-drive cam groove C1 to push the associated follower pin 19f forward. As a result, the first lens frame 20 and the second lens group moving frame 19 (the light shield ring 19c) which are in contact with each other at the mechanically contacting point P move linearly forward to release the contact therebetween, while the second lens group moving frame 19 which is in contact with the third lens frame 22 at the mechanically contacting point Q moves forward linearly to release the contact between the second lens group moving frame 19 with the third lens group L3.

If the rotatable ring 14 further rotates in the same direction to extend the zoom lens barrel 1 relative to the stationary ring 13, the cam ring 15 moves in the optical axis direction while rotating about the optical axis O due to the engagement of the follower pins 15 of the cam ring 15 with the linear groove portions 14a1 of the rotatable ring 14 and the state-changing slot portions 13b2 of the stationary ring 13, until the rotatable ring 14 reaches the zooming section. In an early state of this rotation of the cam ring 15 by the state-changing slot portions 13b2 of the stationary ring 13, the three rotation transfer faces 15d of the cam ring 15 are respectively disengaged from the three engaging portions 31a of the barrier drive ring 31 so that the barrier drive ring 31 is rotated in a direction to open the pair of barrier blades 42 by the spring force of the helical extension spring 45 against the spring force of the two torsion springs 43. Accordingly, the second lens group moving frame 19 rotates about the optical axis O relative to the first lens group moving frame 18 so that the first lens frame 20 slides on the low-frictional sheet 26 before and after the opening operation of the pair of barrier blades 42.

When each follower pin 15b of the cam ring 15 reaches the zooming slot portion 13b3 of the associated cam slot 13b by rotation of the rotatable ring 14 in the same rotational direction, rear faces 32b of the set of three inward projections 32c of the biasing ring 32 come into contact with the set of three follower pins 15b of the cam ring 15, respectively (see the zoom lens barrel 1 below the optical axis O in FIG. 7). Each follower pin 15b is pressed against the rear side edge of the zooming slot portion 13b3 of the associated cam slot 13b by the rear face 32b of the associated inward projection 32c since the biasing ring 32 is biased rearward by the three helical extension springs 33. This state is maintained as long as each follower pin 15b is engaged in the zooming slot portion 13b3 of the associated cam slot 13b, while backlash and play of the cam ring 15 with respect to the stationary barrel 13 is removed as long as the cam ring 15 rotates within the zooming section shown in FIG. 11 via the rotatable ring 14.

If the cam ring 15 rotates in a direction from the accommodation rotational position to the zooming section via the preparation section (i.e., in the barrier opening direction), each follower pin 18f of the first lens group moving frame 18 which is engaged in the first-lens-group accommodation section C1A1 moves from the first-lens-group accommodation section C1A1 to the first-lens-group zooming section C1Z1 via the second-lens-group zooming section C1Z2, while each follower pin 19f of the second lens group moving frame 19 which is engaged in the second-lens-group accommodation section C1A2 moves from the second-lens-group accommodation section C1A2 to the second-lens-group zooming section C1Z2 via the first-lens-group accommodation section C1A1. If the cam ring 15 rotates in the zooming range (i.e., in the first-lens-group zooming section C1Z1 and the second-lens-group zooming section C1Z2), the first and second lens group moving frames 18 and 19 (the first and second lens groups L1 and L2) move in the optical axis direction in respective zoom paths thereof in accordance with the profiles of the first-lens-group zooming section C1Z1 and the second-lens-group zooming section C1Z2, to thereby vary the focal length of the photographing optical system which includes the first, second and third lens groups L1, L2 and L3, i.e., to perform a zooming operation. This zooming operation is carried out by manually operating a conventional zoom switch (not shown). Immediately after a release button is depressed, the aforementioned step motor (not shown), which drives feed screw 24 to move the third lens frame 22 (the third lens group L3), rotates by an amount of rotation corresponding to information on a photographing distance to move the third lens group L to bring an object into focus. The shutter unit 21 drives the shutter blades 21a to open and close in accordance with the information on the object brightness.

If the first lens group moving frame 18 moves linearly in the optical axis direction, the inner ring 17 also moves in the optical axis direction without varying the position thereof relative to the first lens group moving frame 18 due to the engagement of the set of three follower pins 17f with the set of three cam grooves C2 of the cam ring 15, the profiles of which are similar to those of the lens-drive cam grooves C1. At the same time, the outer ring 16 and the inner ring 17, the respective outer peripheral surfaces of which are exposed to the outside of the zoom lens barrel 1, move together in the optical axis direction since the outer ring 16 moves together with the cam ring 15 in the optical axis direction at all times due to the engagement of the set of three bayonet prongs 16d with the circumferential groove 15c.

If the cam ring 15 rotates in a direction from the zooming section via the preparation section (i.e., in the barrier closing direction), the outer and inner rings 16 and 17 retract together in the optical axis direction by operations reverse to the above described operations. Subsequently, the first lens frame 20, which supports the first lens group L1, and the second lens group moving frame 19, which supports the second lens group L2, come into contact with each other at their respective rear ends via the three helical compression springs 30, while the second lens group moving frame 19 retreats until coming into contact with the third lens frame 22 to push the third lens frame 22 against the filter holding portion 11c against the helical compression spring 23, which presses the third lens frame 22 forward. At the same time, the three rotation transfer faces 15d respectively press the three engaging portions 31a of the barrier drive ring 31 against the spring force of the helical extension spring 45 to rotate the barrier drive ring 31 in a direction to close the pair of barrier blades 42 to shut the photographing aperture 41a.

The cam ring (rotational member) 15, the inner ring (linear ring) 17, the outer ring 16, the linear guide keys 17b, the linear guide grooves 16c, and the pair of barrier blades 42 are fundamental elements of a lens barrier mechanism of the zoom lens barrel 1.

In the present embodiment of the zoom lens barrel, the inner ring 17 is successfully formed to have a small wall thickness because linear guide keys (i.e., the set of linear guide keys 17*b*) are formed on the inner ring 17 instead of cam grooves. This structure makes it possible to achieve the inner ring 17 having a large inner diameter with a minimum increase of the outer diameter thereof, which in turn makes it possible to provide the lens barrier mechanism having a large diameter on the inner ring 17; as a consequence, the pair of barrier blades 42 of the lens barrier mechanism can open and close widely.

Since the pair of barrier blades 42 are driven via the cam ring 15, the lens barrier mechanism has a simple structure with a small number of elements.

Although the barrier unit 40 is designed so that the pair of barrier blades 42 are always biased to close the photographing aperture 41*a* by the two torsion springs 43, the barrier unit 40 can be designed so that the pair of barrier blades 42 are always biased to open the photographing aperture 41*a* by similar springs.

As shown in FIG. 8, the set of three recesses 15*k* are formed to be positioned on the cam ring 15 at portions other than the portions where the three lens-drive cam grooves C1 and the three cam grooves C2 are formed. In other words, the three lens-drive cam grooves C1 and the three cam grooves C2 are partly formed on portions of the cam ring 15 which are positioned in front of the edge-faces (right edges as viewed in FIG. 8) of the recesses 15*k*. This structure contributes to a reduction of the length of the cam ring 15 in the optical axis direction.

In the present embodiment of the zoom lens barrel, since the outer ring 16 moves together with the cam ring 15 in the optical axis direction at all times due to the engagement of the bayonet prongs 16*d* with the circumferential groove 15*c*, the cam ring 15 is surrounded by the outer ring 16 at all times. Accordingly, the cam ring 15 is never exposed to the outside of the zoom lens barrel 1. This prevents a poor outward appearance of the zoom lens barrel 1.

Moreover, even if an external force is applied to the outer ring 16, the external force does not directly reach the cam ring 15 (the external force reaches the cam ring 15 via the inner ring 17) since the cam ring 15 is not exposed to the outside of the zoom lens barrel 1. Therefore, this structure makes it possible to move the first and second lens groups L1 and L2 linearly in the optical axis direction by the cam ring 15 with precision.

In regard to the pair of barrier blades 42 of the barrier unit 40, although the radial width of each barrier blade 42 which is radially retracted when opened can be decreased if more than two barrier blades, e.g., four barrier blades which overlap each other when they close are used, the total thickness of the four barrier blades in the optical axis direction generally increases. Conversely, if only one or two barrier blades are used, the radial width of each barrier blade generally increases though the total thickness of the blade(s) in the optical axis direction decreases. However, in the present embodiment of the zoom lens barrel, the formation of the two cutout portions 17*k* on the main body ring 17*r* that serve as recesses for the pair of barrier blades 42 makes it possible to achieve a pair of barrier blades each having a long radial width with a small total thickness in the optical axis direction with a minimum increase in the diameter of the inner ring 17.

Although the inner ring 17 is provided with the set of linear guide keys 17*b* while the outer ring 16 is provided with the set of linear guide grooves 16*c* in the above illustrated embodiment, the inner ring 17 can provided with a set of linear guide grooves corresponding to the linear guide grooves 16*c* while the outer ring 16 can be provided with a set of linear guide keys corresponding to the set of linear guide keys 17*b*. The above described linear guiding mechanism for guiding the first and second lens group moving frames 18 and 19 in the optical axis direction without rotating about the optical axis O is not limited solely to such a particular mechanism as long as the general concept of the set of lens-drive cam grooves C1 is applied to the lens barrel. Although the set of three lens-drive cam grooves C1 are formed on the cam ring 15 in the above illustrated embodiment of the zoom lens barrel 1, a similar effect can be expected with only one lens-drive cam groove C1 in theory.

The present invention can be applied not only to a zoom lens barrel, but also to a fixed-focal-length lens barrel having a ring member which projects from and retracts into a camera body.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens barrel comprising:

a stationary barrel, an outer ring, an inner ring, a cam ring and a movable lens frame, arranged in that order from outermost side, wherein the axes thereof coincide with a common optical axis; said outer ring being guided linearly in the optical axis direction by said stationary barrel; said inner ring being linearly guided in the optical axis direction by said outer ring via a linear guide key and a linear guide groove provided on one and the other of said inner ring and said outer ring, respectively; and said cam ring being rotatable to move said movable lens frame in the optical axis direction; and a lens barrier mechanism having an aperture positioned in front of said movable lens frame, said lens barrier mechanism being provided on a front opening of said inner ring, for opening and closing said aperture.

2. The lens barrel according to claim 1, wherein said outer ring is linearly guided in the optical axis direction relative to said stationary barrel via a linear guide key and a linear guide groove provided on one and other of said outer ring and said stationary barrel, respectively.

3. The lens barrel according to claim 1, wherein said cam ring comprises a thick-wall cylinder portion and a circumferential groove provided in front of said thick-wall cylinder portion; and wherein said outer ring includes projections formed at a rear end portion of said outer ring to be engaged in said circumferential groove to be rotatable about said optical axis along said circumferential groove, whereby said cam ring is movable in said optical axis direction together with said outer ring.

4. The lens barrel according to claim 1, wherein said cam ring comprises at least one first cam groove and at least one second cam groove formed on inner and outer surfaces of said cam ring, respectively, said lens barrel further comprising:

a first cam mechanism for moving said movable lens frame to a position forward from said cam ring in said optical axis direction by said rotation of said cam ring in accordance with a profile of said first cam groove; and a second cam mechanism for moving said inner ring in said optical axis direction by rotation of said cam ring in accordance with a profile of said second cam groove.

5. The lens barrel according to claim 4, wherein said profile of said first cam groove and said profile of said second cam groove are formed so as to move said movable lens frame and said inner ring while maintaining a substantially constant distance therebetween in said optical axis direction.

6. The lens barrel according to claim 4, wherein said lens barrier mechanism comprises:
   a pair of barrier blades driven to open and close said aperture; and
   a drive ring driven to rotate about said optical axis to drive said pair of barrier blades to open and close said aperture, said drive ring having at least one engaging surface;
   wherein said cam ring includes at least one rotation transfer face formed at a front end of said cam ring to extend parallel to said optical axis, said rotation transfer face coming into contact with corresponding said engaging surface of said drive ring to rotate said drive ring; and
   wherein a portion of at least one of said first cam groove and said second cam groove extends in front of a rearward edge of said rotation transfer face in the optical axis direction.

7. The lens barrel according to claim 6, wherein said drive ring comprises at least one recess, said engaging surface of said drive ring being formed as one surface of said recess.

8. The lens barrel according to claim 6, wherein said cam ring comprises at least one recess formed at said front end of said cam ring at portions other than portions of said cam ring on which said first cam groove and said second cam groove are formed, said rotation transfer face of said cam ring constituting one surface of said recess.

9. The lens barrel according to claim 6, wherein said inner ring and said outer ring are movable between respective accommodation positions and respective advanced positions in front of said respective accommodation positions;
   wherein said inner ring includes an opening which corresponds with said rotation transfer face of the cam ring; and
   wherein said rotation transfer face of said cam ring extends through said inner ring via said opening of said inner ring to come in contact with corresponding said engaging surface of said drive ring when said inner ring and said outer ring are positioned in said respective accommodation positions.

10. The lens barrel according to claim 1, wherein said lens barrel comprises a zoom lens barrel.

11. The lens barrel according to claim 3, wherein said thick-wall cylinder portion is formed at a rear end of said cam ring, said circumferential groove being formed on an outer peripheral surface of said cam ring immediately in front of said thick-wall cylinder portion, and said projections extending radially inwards to be engaged in said circumferential groove.

12. The lens barrel according to claim 4, wherein said second cam mechanism moves said inner ring forward in said optical axis direction relative to said cam ring via said rotation of said cam ring in accordance with said profile of said second cam groove.

13. The lens barrel according to claim 6, wherein said recess is formed on an outer peripheral surface of said drive ring.

14. A lens barrel having a lens barrier mechanism for opening and closing an aperture in front of a lens group, said lens barrier mechanism being fixed to a front end of a ring member provided around said lens group, said lens barrier mechanism comprising:
   a pair of barrier blades each of which is rotatable about a pivot in order to open and close said aperture; and
   a pair of recesses formed on an inner periphery of said ring member so as to allow said pair of barrier blades to partly enter said pair of recesses, respectively, when said pair of barriers fully open said aperture.

15. The lens barrel according to claim 14, wherein at least part of said ring member is formed as synthetic resin.

16. The lens barrel according to claim 14, wherein said ring member comprises:
   a main ring body made of synthetic resin; and
   a metal reinforcing ring fitted on said main ring body to be fixed thereto;
   wherein said pair of recesses are formed on said main ring body; and
   wherein a radially outermost position at a free end of each said pair of barrier blades is defined by an inner peripheral surface of said reinforcing ring.

17. The lens barrel according to claim 14, wherein said lens barrier mechanism further comprises a front end exterior plate on which said aperture is formed, each said pivot projecting rearward from a rear surface of said front exterior plate.

18. The lens barrel according to claim 1, wherein said lens barrel comprises an extendable lens barrel.

19. The lens barrel according to claim 14, wherein said lens barrel comprises an extendable lens barrel.

20. A photographing lens barrel comprising:
   a pivoted barrier blade driven to open and close a photographing aperture in front of a front lens group;
   a ring member provided around said lens group, said pivoted barrier blade being supported by a front portion of said ring member; and
   a recess formed on said ring member so as to allow said barrier blade to partly enter said recess.

* * * * *